United States Patent
Wu et al.

(10) Patent No.: US 11,652,523 B2
(45) Date of Patent: May 16, 2023

(54) BEAM TRAINING METHOD AND COMMUNICATIONS APPARATUS

(71) Applicant: HUAWEI TECHNOLOGIES CO., LTD., Guangdong (CN)

(72) Inventors: Ye Wu, Shanghai (CN); Hongzhe Shi, Shanghai (CN); Huang Huang, Chengdu (CN); Huangping Jin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 23 days.

(21) Appl. No.: 17/110,764

(22) Filed: Dec. 3, 2020

(65) Prior Publication Data
US 2021/0091834 A1    Mar. 25, 2021

Related U.S. Application Data

(63) Continuation of application No. PCT/CN2019/089996, filed on Jun. 4, 2019.

(30) Foreign Application Priority Data

Jun. 8, 2018   (CN) .......................... 201810585522.0

(51) Int. Cl.
*H04B 7/06*      (2006.01)
*H04W 72/51*    (2023.01)
(Continued)

(52) U.S. Cl.
CPC .......... *H04B 7/0617* (2013.01); *H04B 17/318* (2015.01); *H04L 5/0048* (2013.01); *H04W 72/51* (2023.01)

(58) Field of Classification Search
CPC .. H04B 7/0404; H04B 7/0617; H04B 17/318; H04W 72/046; H04W 72/048; H04W 76/11
See application file for complete search history.

(56) References Cited

U.S. PATENT DOCUMENTS

2013/0223251 A1   8/2013   Li et al.
2018/0227094 A1*  8/2018   Liu .................... H04W 72/046
(Continued)

FOREIGN PATENT DOCUMENTS

CN   105656533 A   6/2016
CN   107733484 A   2/2018
(Continued)

OTHER PUBLICATIONS

Qualcomm Incorporated, Multiple SS block transmissions design in wideband CC . 3GPP TSG-RAN WG1 #90, Aug. 21-25, 2017, Prague, CZ, R1-1714601, 4 pages.
(Continued)

*Primary Examiner* — Benjamin H Elliott, IV
*Assistant Examiner* — Prince A Mensah
(74) *Attorney, Agent, or Firm* — Womble Bond Dickinson (US) LLP

(57) ABSTRACT

The application provides a beam training method and a communications apparatus. The method includes: generating, by a terminal device, capability indication information, where the capability indication information is used to indicate that the terminal device can support simultaneous beam training in a maximum of N frequency bands, and N is an integer greater than or equal to 1; and sending, by the terminal device, the capability indication information. In this way, the network device may select a plurality of frequency bands at a time based on a capability of the terminal device to simultaneously perform beam training. Therefore, in an embodiments of this application, when the quantity N, of frequency bands for simultaneous training, supported by the terminal device is greater than 1, beam training may be simultaneously performed between the network device and the terminal device in a plurality of frequency bands.

20 Claims, 5 Drawing Sheets

(51) Int. Cl.
    *H04B 17/318* (2015.01)
    *H04L 5/00* (2006.01)

(56) References Cited

U.S. PATENT DOCUMENTS

| | | | | |
|---|---|---|---|---|
| 2019/0200388 A1* | 6/2019 | Park | ............... | H04B 7/088 |
| 2020/0029297 A1* | 1/2020 | Baek | ............... | H04W 76/11 |
| 2020/0336188 A1* | 10/2020 | Wang | ............... | H04B 7/0404 |

FOREIGN PATENT DOCUMENTS

| | | |
|---|---|---|
| CN | 107872844 A | 4/2018 |
| CN | 107888240 A | 4/2018 |
| CN | 109150254 A | 1/2019 |
| WO | 2018064399 A1 | 4/2018 |
| WO | 2018081926 A1 | 5/2018 |
| WO | 2018099328 A1 | 6/2018 |

OTHER PUBLICATIONS

NTT Docomo, Inc., Discussion on UE measurement capability requirements. 3GPP TSG RAN WG4 Meeting #85, Reno, USA, Nov. 27-Dec. 1, 2017, R4-1713010, 5 pages.

Huawei, HiSilicon, Access mechanism for beam based approach. 3GPP TSG RAN WG1 Meeting #86, Gothenburg, Sweden, Aug. 22-26, 2016, R1-166088, 8 pages.

Zte et al.,"Discussion on beam management",3GPP TSG RAN WG1 Meeting #91 R1-1719533,Reno, USA, Nov. 27-Dec. 1, 2017,total 11 pages.

3GPP TS 38.214 V15.1.0 (Mar. 2018);3rd Generation Partnership Project Technical Specification Group Radio Access Network;NR;Physical layer procedures for data (Release 15);total 77 pages.

Vivo,"Discussion on beam measurement, beam reporting and beam indication",3GPP TSG RAN WG1 Meeting #90bis R1-1717472,Prague, CZ, Oct. 9-13, 2017,total 12 pages.

* cited by examiner

BEAM TRAINING METHOD AND COMMUNICATIONS APPARATUS

CROSS-REFERENCE TO RELATED APPLICATIONS

This application is a continuation of International Application No. PCT/CN2019/089996, filed on Jun. 4, 2019, which claims priority to Chinese Patent Application No. 201810585522.0, filed on Jun. 8, 2018. The disclosures of the aforementioned applications are hereby incorporated by reference in their entireties.

TECHNICAL FIELD

The application relates to the field of communications, and in particular, to a beam training method and a communications apparatus.

BACKGROUND

In a 5th generation mobile communications (5G) system, low-frequency (for example, a frequency lower than 6 GHz) communication cannot satisfy increasing communication requirements. Therefore, high-frequency (for example, a frequency higher than 6 GHz) communication (HF) is gaining increasing attention in both the academic and industry sectors.

However, because energy of an HF signal attenuates quickly in space, the HF signal has a weak penetration capability, and a signal path loss is far greater than that of a low-frequency signal, gains on an antenna side need to be used to compensate for this loss, to ensure coverage of an HF system. In addition, because of a shorter signal wavelength and a smaller antenna size in an HF scenario, a multi-antenna (Massive-MIMO) technology of a large-scale antenna array is more suitable for applications in the HF scenario. By using the massive-MIMO technology, a transmit beam with more concentrated energy may be formed on a transmit side such as a network device side in a digital and/or analog manner or another manner to ensure system coverage, and a receive beam with more concentrated energy may also be formed on a receive side such as a terminal device side to increase a receive gain.

In an HF system, both a receive end and a transmit end tend to use a narrow beam for communication. Therefore, mutual matching of narrow beams is particularly important. A network device and a terminal device may perform beam training to enable the transmit beam and the receive beam to match each other.

However, in the current technology, beam training efficiency is relatively low. Therefore, how to improve beam training efficiency becomes an urgent problem to be resolved.

SUMMARY

This application provides a beam training method and a communications apparatus. The method can improve beam training efficiency.

According to a first aspect, a beam training method is provided. The method includes: A terminal device generates capability indication information. The capability indication information is used to indicate that the terminal device can support simultaneous beam training in a maximum of N frequency bands. N is an integer greater than or equal to 1. The terminal device sends the capability indication information.

According to a second aspect, a beam training method is provided. The method includes: A network device receives capability indication information sent by a terminal device. The capability indication information is used to indicate that the terminal device can support simultaneous beam training in a maximum of N frequency bands. N is an integer greater than or equal to 1. The network device indicates, based on the capability indication information, the terminal device to perform beam training.

Therefore, in an embodiment of this application, the terminal device reports the capability indication information to the network device, so that the network device can simultaneously perform beam training in a plurality of frequency bands based on a capability of the terminal device. In this way, beam training efficiency can be improved in this embodiment of this application.

In an embodiment, the terminal device may generate the capability indication information based on a default configuration, for example, but not limited to, a capability of receiving beams by the terminal device, a reference signal received power (reference signal receiving power, RSRP) (for example, the RSPR may be a layer 1 reference signal received power (layer 1 reference signal received power, L1-RSRP)) calculation capability, and the like. This embodiment of this application is not limited thereto.

With reference to the first aspect or the second aspect, in an embodiment, the frequency band indicates a segment of continuous frequency domain resources. For example, the frequency band may be a bandwidth part (BWP). The BWP may be understood as a segment of continuous frequency bands. The frequency band includes at least one continuous sub-band. Each bandwidth part may correspond to a group of numerologies, including, for example, but not limited to, a subcarrier spacing, a cyclic prefix (CP) length, a transmission time interval (TTI), a quantity of symbols, a resource block (RB) location, a slot length, and a frame format. In this embodiment of this application, different bandwidth parts may correspond to different numerologies. For a definition of the bandwidth part, refer to the current technology, for example, but not limited to, various proposals for NR. As the technology continuously develops, the foregoing definition may also change.

With reference to the first aspect or the second aspect, in an implementation, the frequency band may also be a beam tracking band.

It should be understood that, in an embodiment of this application, the beam tracking band may include at least one subcarrier. In an embodiment, the beam tracking band may include at least one resource block (RB) in frequency domain. In an embodiment, the beam tracking band may include at least one precoding group (PRG) in frequency domain. Alternatively, the beam tracking band may include at least one resource block group (RBG) in frequency domain.

Optionally, in an embodiment of this application, only a signal used for beam training can be scheduled in the beam tracking band. In an embodiment, only a signal and a control channel (for example, a physical downlink control channel (PDCCH)) that are used for beam training can be scheduled in the beam tracking band. In an embodiment, signals used for beam training and scheduled between different beam tracking bands may be different.

With reference to the first aspect or the second aspect, in an embodiment, the N frequency bands belong to a same carrier CC.

With reference to the first aspect or the second aspect, in an embodiment, the CC includes a frequency domain width occupied by one orthogonal frequency division multiplexing OFDM symbol.

In an embodiment of this application, on a same CC, on a same OFDM symbol, the terminal device expects, by using capability indication information, to simultaneously perform beam training in different frequency bands (for example, BWPs). To be specific, the terminal device expects that respective independent spatial domain filters (downlink spatial domain transmission filter) may be used in BWPs. Different downlink spatial domain filters or a same downlink spatial domain filter may be used for signals that are used for beam training and are transmitted in different BWPs.

It should be understood that, in this embodiment of this application, during beam training, a signal used for beam training and transmitted in the frequency band may be at least one type of signal in the following signals: an aperiodic channel state information reference signal (A-CSI-RS), a periodic channel state information reference signal (P-CSI-RS), a semi-persistent channel state information reference signal (SP-CSI-RS), and a synchronization signal/broadcast channel (PBCH) block (SSB).

Optionally, in this embodiment of this application, the A-CSI-RS, the P-CSI-RS, and the SP-CSI-RS may be collectively referred to as a channel state information reference signal (CSI-RS). In other words, in this embodiment of this application, the signal used for beam training and transmitted in the frequency band may be at least one type of signal in a CSI-RS and an SSB.

It should be understood that the signal used for beam training in this embodiment of this application may alternatively be another signal. This embodiment of this application is not limited thereto.

For whether to distinguish between types of signals transmitted in the frequency band, the capability indication information in this embodiment of this application is described in the following two cases.

Case 1: For different signals, in an embodiment of this application, the terminal device may not distinguish between signal types and report only one capability. In other words, signals used for beam training and transmitted in the frequency band all correspond to the same capability.

It should be understood that the "capability" in this specification is a capability that the terminal device can support simultaneous beam training in a plurality of frequency bands. One capability corresponds to one capability value. For example, a capability value N corresponding to one capability indicates that the terminal device can support simultaneous beam training in a maximum of N frequency bands.

Case 2: The terminal device distinguishes between signal types, and needs to report a plurality of capabilities for a plurality of signals, where different signals of the plurality of signals may correspond to a same capability value or different capability values. In other words, capability values corresponding to the plurality of capabilities corresponding to the plurality of signals may be the same or may be different. It should be understood that a capability value corresponding to the first signal may indicate a maximum quantity, of frequency bands (herein, the frequency band is a frequency band in which the first signal is transmitted) for simultaneous beam training, supported by the terminal device.

The following separately describes the two cases in detail.

First, the foregoing case 1 is described. In an embodiment, the case 1 is a case in which the terminal device does not distinguish between signal types, and reports only one capability.

In an embodiment, signal types may not be distinguished for the capability indication information. In this case, during actual beam training, a signal transmitted in each of a plurality of frequency bands in which beam training is simultaneously performed is not limited. For example, the signal transmitted in each frequency band may be any one or more of an A-CSI-RS, a P-CSI-RS, an SP-CSI-RS, and an SSB. Alternatively, the signal transmitted in each frequency band may be one or both of a CSI-RS and an SSB. This embodiment of this application is not limited thereto.

In other words, a capability reported by the terminal device is not limited by a signal type. After reporting the capability indication information, the terminal device does not expect that a quantity of scheduled BWPs in which simultaneous L1-RSRP measurement and calculation are performed exceeds the capability value N. That is, the maximum quantity of BWPs expected by the terminal device to simultaneously perform L1-RSRP measurement and calculation is N.

With reference to the first aspect or the second aspect, in an embodiment, the method further includes:

The terminal device simultaneously performs beam training in L frequency bands. For example, the terminal device simultaneously calculates layer 1 reference signal received powers (L1-RSRP) in the L frequency bands, where L is an integer less than or equal to N.

For example, a signal used for L1-RSRP calculation may be any one or more of an A-CSI-RS, a P-CSI-RS, an SP-CSI-RS, and an SSB. Alternatively, a signal used for LI-RSRP calculation may be any one or more of a CSI-RS and an SSB.

With reference to the first aspect or the second aspect, in an embodiment, that the network device indicates, based on the capability indication information, the terminal device to perform beam training includes:

The network device indicates, based on the capability indication information, the terminal device to simultaneously calculate L1-RSRPs in the L frequency bands, where L is an integer less than or equal to N.

In an embodiment, the capability indication information may include a value of N. That is, the capability indication information includes the capability value N of the terminal device.

That is, the terminal device may directly report the capability value N by using the capability indication information.

In an embodiment, the network device may directly determine the capability value of the terminal device based on obtained capability indication information. Further, the network device may determine a quantity of frequency bands for simultaneous beam training. It should be understood that the quantity, of frequency bands for simultaneous beam training, determined by the network device is usually less than or equal to a capability value reported by the terminal device.

Therefore, in an embodiment of this application, the terminal device reports the capability value, so that the network device can directly determine a capability of the terminal device based on the capability value, and no additional calculation process is required. This can reduce calculation overheads.

In an embodiment, the capability indication information includes first indication information and second indication information. The first indication information is used to indicate a maximum quantity x, of frequency bands that are simultaneously in an active state, supported by the terminal device. The second indication information is used to indicate a maximum quantity y, of analog beams, panels, or simultaneous spatial domain receive filters that are used for receiving, supported by the terminal device. x and y are used to determine a value of N.

x may be a maximum quantity, of frequency bands for simultaneous channel state information (CSI) measurement, supported by the terminal device and/or a maximum quantity, of frequency bands used for data transmission, supported by the terminal device.

In other words, the terminal device reports x and y by using the capability indication information, to indirectly indicate the capability value of the terminal device. That is, the terminal device indirectly reports the capability value by using the capability indication information.

In this case, the network device needs to calculate and determine a capability value of the terminal device based on capability information reported by the terminal device, that is, x and y.

In an embodiment, N is a smaller value in x and y. In other words, x>y, and N=y; or x<=y, and N=x.

Further, the terminal device may further report, by using the capability indication information, whether a single spatial domain receive filter is supported. The single spatial domain receive filter may also be referred to as an omnidirectional filter. If the terminal device reports that a single spatial domain filter is supported, that is, if the terminal device has an omnidirectional receive beam capability, a value of y may be ignored when the value of N is determined, that is, N=x. Alternatively, in this case, the terminal device may not need to report a value of y, that is, the terminal device reports a value of x and supports a single spatial domain filter by using the capability indication information; in this case, N=x.

In an embodiment, if the terminal device reports that a single spatial domain receive filter is not supported or does not report whether a single spatial domain filter is supported, it may be considered that the terminal device does not have an omnidirectional receive beam capability. In this case, a value of y is not ignored when the value of N is determined, and the value of N is still calculated based on N=min(x, y).

In an embodiment, if the terminal device does not report whether a single domain receive spatial filter is supported, it may also be considered that the terminal device has an omnidirectional receive beam capability, and a value of y may be ignored when the value of N is determined; in this case, N=x. Alternatively, in this case, the terminal device may not need to report a value of y. That is, the terminal device reports a value of x by using the capability indication information. In this case, N=x.

Therefore, in this embodiment of this application, the terminal device may indirectly report a capability of the terminal device by using existing information, and does not need to specially report the capability value of the terminal device. This can reduce signaling overheads and save network resources.

The following describes the case 2 in which the terminal device needs to distinguish between signal types to report a plurality of capabilities.

With reference to the first aspect or the second aspect, in an embodiment, the capability indication information is specifically used to indicate that the terminal device can support simultaneous beam training in a maximum of $n_i$ frequency bands for an $i^{th}$ signal set in m signal sets, where i represents a number of a signal set, i traverses values 1, 2, . . . , and m, m represents a quantity of the signal sets, $n_i$ is an integer greater than or equal to 1, m is an integer greater than or equal to 1, N is a maximum value of $n_i$, the $i^{th}$ signal set includes at least one signal, and a maximum quantity, of frequency bands for beam training, that can be supported by the terminal device for each signal in the at least one signal is $n_i$.

In an embodiment, $n_i$ may represent a maximum quantity of frequency bands used by the terminal device to simultaneously perform beam training based on each signal in the $i^{th}$ signal set. For example, the $i^{th}$ signal includes a signal 1 and a signal 2. In this case, a maximum quantity of frequency bands used by the terminal device to simultaneously perform beam training based on the signal 1 is $n_i$, and a maximum quantity of frequency bands used by the terminal device to simultaneously perform beam training based on the signal 2 is $n_i$.

Further, in an embodiment of this application, the $i^{th}$ signal set may be considered as a whole, and $n_i$ may also represent a maximum quantity of frequency bands used by the terminal device to simultaneously perform beam training based on all signals in the $i^{th}$ signal set. For example, the $i^{th}$ signal includes the signal 1 and the signal 2. In this case, a maximum quantity of frequency bands used by the terminal device to simultaneously perform beam training based on the $i^{th}$ signal set is $n_i$. In other words, during beam training of the terminal device, a sum of all frequency bands carrying the signals in the $i^{th}$ signal set is not greater than $n_i$.

With reference to the first aspect or the second aspect, in an embodiment, the method further includes:

The terminal device calculates L1-RSRPs of first signals simultaneously transmitted in z frequency bands, where z is an integer not greater than $n_i$, and the first signal is any signal in the $i^{th}$ signal set.

With reference to the first aspect or the second aspect, in an embodiment, that the network device indicates, based on the capability indication information, the terminal device to perform beam training includes:

The network device indicates, based on the capability indication information, the terminal device to calculate L1-RSRPs of first signals simultaneously transmitted in z frequency bands, where z is an integer not greater than and the first signal is any signal in the $i^{th}$ signal set.

In other words, for a signal in the $i^{th}$ signal set, the network device and the terminal device simultaneously perform beam training in z frequency bands. During actual beam training, a signal used for beam training may not be limited to the signal. Therefore, for all signals used for beam training, the at least one frequency band may be P frequency bands. In other words, the network device and the terminal device simultaneously perform beam training in the P frequency bands. The P frequency bands include the z frequency bands in which the first signal in the $i^{th}$ signal set is simultaneously transmitted, z is an integer not greater than $n_i$, and the first signal is any signal in the $i^{th}$ signal set.

Further, by way of example and not limitation, in the P frequency bands, a total quantity of frequency bands carrying the signals in the $i^{th}$ signal set is not greater than $n_i$. In other words, during beam training, a total quantity of frequency bands occupied by all signals in the $i^{th}$ signal set is less than or equal to $n_i$. During beam training, for each signal, a quantity of frequency bands in which the signal is transmitted is less than or equal to a capability value corresponding to the signal.

In an embodiment, a value of P and/or z may be determined by the network device based on factors such as a capability of the network device and/or a measurement requirement of the terminal device. This embodiment of this application is not limited thereto.

In an embodiment, P is less than or equal to N. That is, a value of P is less than or equal to a maximum capability value N corresponding to a signal.

In an embodiment, in this embodiment of this application, P may also be greater than N. For example, a maximum value of P is $n_1+n_2+ \ldots +n_m$.

With reference to the first aspect or the second aspect, in an embodiment, different signal sets in the m signal sets include different signals, and the $i^{th}$ signal set includes at least one type of signal in a channel state information reference signal CSI-RS and a synchronization signal/broadcast channel block SSB.

With reference to the first aspect or the second aspect, in an embodiment, the CSI-RS includes at least one type of signal in an aperiodic channel state information reference signal A-CSI-RS, a periodic channel state information reference signal P-CSI-RS, and a semi-persistent channel state information reference signal SP-CSI-RS.

It should be noted that, in this embodiment of this application, a set of signals used for beam training may be referred to as a preset signal set. For example, the preset signal set includes an A-CSI-RS, a P-CSI-RS, an SP-CSI-RS, and an SSB. Alternatively, the preset signal set includes a CSI-RS and an SSB.

It should be understood that the preset signal set in this embodiment of this application may represent a set of signals used for beam training in an actual beam training process. Certainly, the signals used for beam training during actual application are not limited to the foregoing several types of signals listed in this embodiment of this application. During actual application, signals (a preset signal set) used for beam training may include only some of the foregoing signals, or signals (a preset signal set) used for beam training may further include another signal. This embodiment of this application is not limited thereto.

It should be understood that the preset signal set may also be referred to as a signal set, a first set, or the like used for beam training. This embodiment of this application is not limited thereto.

With reference to the first aspect or the second aspect, in an embodiment, the capability indication information includes a value of $n_i$. That is, the capability indication information includes m capability values corresponding to the m signal sets.

For example, when each signal set includes one signal, the $i^{th}$ signal set may also be referred to as an $i^{th}$ signal. That is, when the network device reports one capability for each signal, the capability indication information may include m capability values corresponding to m signals.

With reference to the first aspect or the second aspect, in an embodiment, m=1. The capability indication information includes first indication information and second indication information. The first indication information is used to indicate a maximum quantity x, of frequency bands that are simultaneously in an active state, supported by the terminal device. The second indication information is used to indicate a maximum quantity y, of analog beams, panels, or spatial domain receive filters that are simultaneously used for receiving, supported by the terminal device. x and y are used to determine a value of $n_1$. Both x and y are integers greater than or equal to 1.

With reference to the first aspect or the second aspect, in an embodiment, $n_1$ is a smaller value in x and y.

That is, when m=1, when the terminal device considers all signals as a set and reports only one capability, the case 2 is the same as the case 1. This case is similar to the description in the foregoing case 1. The terminal device may report first information and second information to indirectly report a capability value supported by the terminal device. This case is similar to the foregoing description, and only N needs to be replaced with $n_1$. Details are not described herein again.

With reference to the first aspect or the second aspect, in an embodiment, the m signal sets include some signals in the preset signal set in total. A quantity of frequency bands corresponding to each of other signals than some signals in the preset signal set is equal to $n_i$ corresponding to a signal set in which a signal with a highest priority in the some signals is located. A quantity of frequency bands corresponding to one signal indicates a maximum quantity of frequency bands used by the terminal device to simultaneously perform beam training based on the signal.

For example, sequences of priorities of the signals are an SSB, a P-CSI-RS, an SP-CSI-RS and an A-CSI-RS in descending order.

Assuming that the signals in the m signal sets do not include the SSB but include the P-CSI-RS, a capability value corresponding to the SSB is equal to a capability value corresponding to the P-CSI-RS.

Assuming that the signals in the m signal sets do not include the SSB and the P-CSI-RS, but include the SP-CSI-RS, capability values corresponding to the SSB and the P-CSI-RS are equal to a capability value corresponding to the SP-CSI-RS.

Assuming that the signals in the m signal sets do not include the SSB, the P-CSI-RS, and the SP-CSI-RS, but include the A-CSI-RS, capability values corresponding to the SSB, the P-CSI-RS, the SP-CSI-RS are equal to a capability value corresponding to the A-CSI-RS.

A case in which the signals in the m signal sets do not include another signal is similar to a case in which the signals in the m signal sets do not include the SSB. Cases are not listed one by one herein.

The foregoing describes a case in which when the capability indication information does not indicate a capability value corresponding to a signal, the capability value corresponding to the signal may be determined based on a priority of the signal. However, an embodiment of this application is not limited thereto. For example, when the capability indication information does not indicate a capability value corresponding to the SSB, the capability value corresponding to the SSB may alternatively be one of the following two values: a capability value corresponding to a CSI-RS, and a capability value corresponding to the periodic CSI-RS.

In an embodiment, when the capability indication information does not indicate a capability value corresponding to the A-CSI-RS, the capability value corresponding to the A-CSI-RS may be a capability value corresponding to the periodic CSI-RS.

In an embodiment of this application, the capability indication information is used to indicate capability values of only some signals. This can reduce signaling overheads.

Actual beam training may include but is not limited to the following process: The terminal device may first measure a signal sent by the network device in at least one frequency band, then calculate and search for a better transmit beam that is of the network device and that corresponds to each frequency band, and finally, feed back information about the better transmit beam in each frequency band to the network device.

In an embodiment of this application, in at least one frequency band, for example, in L frequency bands or P frequency bands, on a same CC, beam training may be simultaneously performed, and the terminal device independently measures and calculates an L1-RSRP for each frequency band (for example, a BWP) in the plurality of frequency bands. That is, in this embodiment of this application, the terminal device measures and calculates an L1-RSRP based on each BWP. When downlink transmit beam (that is, a downlink spatial domain transmission filter) training is performed, the terminal device may feed back an L1-RSRP in each BWP, so that the network device selects a best transmit beam or best transmit beams in one or more BWPs. When downlink receive beam (that is, a downlink spatial domain receive filter) training is performed, the terminal device may determine, based on an L1-RSRP in each BWP, a best receive beam corresponding to a transmit beam in each BWP. Further, the terminal device may further feed back the L1-RSRP in each BWP in which a downlink receive beam is trained. Based on downlink transmit beam training and/or downlink receive beam training, the network device may select at least one BWP, to simultaneously perform subsequent channel state information CSI measurement and/or data transmission by using a best transmit beam and a best receive beam in each selected BWP.

In an embodiment, for a training process of the network device and the terminal device in the at least one frequency band, refer to an existing frequency band training process. Details are not described in this specification.

It should be understood that, in an embodiment of this application, after beam training, the network device may select one or more better frequency bands (for example, BWPs) to communicate with the terminal device by using a beam obtained through training. In an embodiment, a network side may configure the one or more BWPs for the terminal device by using radio resource control (RRC) signaling, downlink control information (DCI), or a media access control control element (MAC CE). This embodiment of this application is not limited thereto.

By way of example and not limitation, the following describes a communication process after one or more BWPs for downlink communication are determined: The network device may send a reference signal to the terminal device by using a beam or beams in the one or more BWPs, to perform channel measurement, then receives channel state information (CSI) fed back by the terminal device and/or CSI obtained through channel heterogeneity, and then sends downlink data in the one or more BWPs based on the CSI.

It should be understood that the communication method provided by this application is not limited to downlink transmission, and may also be applicable to uplink transmission. This application imposes no special limitation on a signal for beam training. For example, for downlink data transmission, the reference signal may be, for example, a channel state information reference signal (CSI-RS) and an SSB; for uplink data transmission, a signal used for beam training may be another signal such as a sounding reference signal (SRS). It should be understood that the signals used for beam training listed above are merely an example for description, but should not constitute any limitation on this application. This application does not exclude a possibility of using another signal to implement beam training. For example, this application does not exclude a possibility of defining another signal used for uplink or downlink beam training in an existing protocol (for example, an LTE protocol or an NR protocol) or a future protocol.

According to a third aspect, a beam training method is provided. The method includes: A terminal device receives first indication information. The first indication information is used to indicate a quantity M of frequency bands in which the terminal device can simultaneously perform beam training. M is an integer greater than or equal to 1. The terminal device performs beam training based on the first indication information.

According to a fourth aspect, a beam training method is provided. The method includes: A network device generates first indication information. The first indication information is used to indicate a quantity M of frequency bands in which a terminal device can simultaneously perform beam training. M is an integer greater than or equal to 1. The network device sends the first indication information.

Therefore, in this embodiment of this application, based on an indication of the network device, beam training may be simultaneously performed between the network device and the terminal device in a plurality of frequency bands, so that beam training efficiency can be improved in this embodiment of this application.

In an embodiment, M represents a maximum quantity of frequency bands in which the terminal device can simultaneously perform beam training.

In other words, the first indication information is used to indicate the maximum quantity M of frequency bands in which the terminal device can simultaneously perform beam training.

During actual beam training, a quantity of frequency bands in which training is simultaneously performed may be less than or equal to M.

Alternatively, M represents a quantity of frequency bands used when the terminal device performs beam training.

In other words, the first indication information is used to indicate the quantity M of frequency bands in which the terminal device simultaneously performs beam training.

During actual beam training, the terminal device simultaneously performs beam training in the M frequency bands. That is, the network device simultaneously sends, in the M frequency bands, a signal used for beam training, to simultaneously train beams in the M frequency bands.

With reference to the third aspect or the fourth aspect, in an embodiment, the method further includes:

The terminal device sends capability indication information to the network device. The capability indication information is used to indicate that the terminal device can support simultaneous beam training in a maximum of N frequency bands. N is an integer greater than or equal to 1. The first indication information is generated by the network device based on the capability indication information, and M≤N.

With reference to the third aspect or the fourth aspect, in an embodiment, the method further includes:

The network device receives the capability indication information sent by the terminal device. The capability indication information is used to indicate that the terminal device can support simultaneous beam training in a maximum of N frequency bands. N is an integer greater than or equal to 1, and M≤N.

That a network device generates first indication information includes: The network device generates the first indication information based on the capability indication information.

With reference to the third aspect or the fourth aspect, in an embodiment, M represents a maximum quantity of frequency bands in which the terminal device simultaneously performs beam training. Alternatively, M represents a quantity of frequency bands used when the terminal device performs beam training.

With reference to the third aspect or the fourth aspect, in an embodiment, that the terminal device performs beam training based on the first indication information includes: The terminal device simultaneously calculates layer 1 reference signal received powers L1-RSRPs of signals transmitted in M' frequency bands. M' is an integer less than or equal to M.

In an embodiment, a value of M' may be determined by the network device based on factors such as a capability of the network device and/or a measurement requirement of the terminal device. This embodiment of this application is not limited thereto.

When M represents the maximum quantity of frequency bands in which the terminal device can simultaneously perform beam training, M' is less than or equal to M.

When M represents the quantity of frequency bands used when the terminal device performs beam training, M' is equal to M.

Therefore, in this embodiment of this application, based on an indication of the network device, beam training may be simultaneously performed between the network device and the terminal device in a plurality of frequency bands, so that beam training efficiency can be improved in this embodiment of this application.

According to a fifth aspect, a communications apparatus is provided, including modules or units configured to perform the method in any one of the embodiments, the third aspect, or the possible implementations of the first aspect or the third aspect.

In an implementation, the communications apparatus is a terminal device.

According to a sixth aspect, a communications apparatus is provided, including modules or units configured to perform the method in any one of the second aspect, the fourth aspect, or the possible implementations of the second aspect or the fourth aspect.

In an implementation, the communications apparatus is a network device.

According to a seventh aspect, a communications apparatus is provided, including a transceiver, a processor, and a memory. The processor is configured to control the transceiver to send and receive a signal. The memory is configured to store a computer program. The processor is configured to invoke the computer program from the memory and run the computer program, so that the network device performs the method in the first aspect, the third aspect, or the possible implementations of the first aspect or the third aspect.

In an embodiment, the communications apparatus is a terminal device.

According to an eighth aspect, a communications apparatus is provided, including a transceiver, a processor, and a memory. The processor is configured to control the transceiver to send and receive a signal. The memory is configured to store a computer program. The processor is configured to invoke the computer program from the memory and run the computer program, so that the terminal device performs the method in the second aspect, the fourth aspect, or the possible implementations of the second aspect or the fourth aspect.

In an embodiment, the communications apparatus is a network device.

According to a ninth aspect, a computer-readable medium is provided. The computer-readable medium stores a computer program. When being executed by a computer, the computer program implements the method in any one of the first aspect, the third aspect, or the possible implementations of the first aspect or the third aspect.

According to a tenth aspect, a computer-readable medium is provided. The computer-readable medium stores a computer program. When being executed by a computer, the computer program implements the method in any one of the second aspect, the fourth aspect, or the possible implementations of the second aspect or the fourth aspect.

According to an eleventh aspect, a computer program product is provided. When being executed by a computer, the computer program product implements the method in any one of the first aspect, the third aspect, or the possible implementations of the first aspect or the third aspect.

According to a twelfth aspect, a computer program product is provided. When being executed by a computer, the computer program product implements the method in any one of the second aspect, the fourth aspect, or the possible implementations of the second aspect or the fourth aspect.

According to a thirteenth aspect, a processing apparatus is provided, including a processor.

In an embodiment, the method in any one of the first aspect to the fourth aspect or the possible implementations of the first aspect to the fourth aspect is executed by the processor. In this case, the processor may be a dedicated processor.

In an embodiment, the processing apparatus may further include a memory. The memory stores code. The processor executes the code in the memory to perform the method in any one of the first aspect to the fourth aspect or the possible implementations of the first aspect to the fourth aspect. In this case, the processor may be a general purpose processor.

It should be understood that, in the thirteenth aspect, a related data interaction process, for example, sending capability indication information, may be a process of outputting the capability indication information from the processor, and receiving capability indication information may be a process of receiving input capability indication information by the processor.

In an embodiment, data output by the processor may be output to a transmitter, and input data received by the processor may be from a receiver. The transmitter and the receiver may be collectively referred to as a transceiver.

The processing apparatus in the thirteenth aspect may be a chip. The processor may be implemented by using hardware, or may be implemented by using software. When the processor is implemented by using the hardware, the processor may be a logic circuit, an integrated circuit, or the like; when the processor is implemented by using the software, the processor may be a general purpose processor, and is implemented by reading software code stored in the memory. The memory may be integrated into the processor, may be located outside the processor and exist independently.

According to a fourteenth aspect, a system is provided, including the foregoing network device and terminal device.

DESCRIPTION OF EMBODIMENTS

Figure 1:
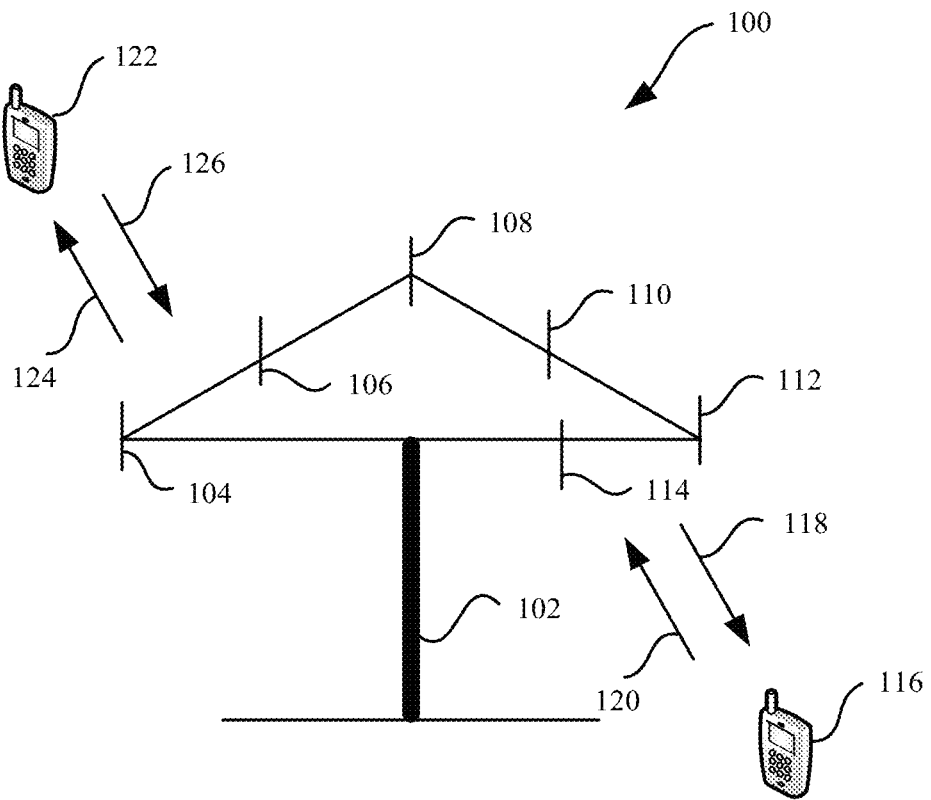
FIG. 1 is a schematic diagram of a scenario to which an embodiment of this application is applicable.

The following describes technical solutions of this application with reference to the accompanying drawings.

Embodiments of this application may be applied to various communications systems. Therefore, the following descriptions are not limited to a particular communications system. A next-generation communications system is a 5th generation (5G) communications system, such as a new radio (NR) system.

In an embodiment of this application, a network device may be a network side device in a future 5G network, for example, a transmission point (TRP or TP) in an NR system, a gNB (gNB) in an NR system, a radio unit such as a remote radio unit in an NR system, or one antenna panel or a group of antenna panels of a base station in a 5G system. Different network devices may be located in a same cell, or may be located in different cells. This is not specifically limited herein.

In an embodiment, the gNB may include a centralized unit (CU) and a distributed unit (DU). The gNB may further include a radio unit (RU). The CU implements some functions of the gNB, and the DU implements some functions of the gNB. For example, the CU implements functions of a radio resource control RRC) layer and a packet data convergence protocol (PDCP) layer, and the DU implements functions of a radio link control (RLC) layer, a media access control (MAC) layer, and a physical (PHY) layer. Information on the RRC layer is eventually converted into information on the PHY layer, or is converted from information on the PHY layer. Therefore, in this architecture, higher layer signaling such as RRC layer signaling or PHCP layer signaling may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal device in an embodiment of this application may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, an unmanned aerial vehicle, a terminal device in a future 5G network, a terminal device in a future evolved public land mobile network (PLMN), or the like. This is not limited in the embodiments of this application.

By way of example and not limitation, in an embodiment, the terminal device may alternatively be a wearable device. The wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device not only is a hardware device, but implements a powerful function through software support, data interaction, and cloud interaction. Generalized wearable intelligent devices include full-featured and large-size devices, such as smart watches or smart glasses, that can implement complete or partial functions without depending on smartphones; and devices, such as various smart bands or smart jewelry for monitoring physical signs, that focus on only one type of application function and need to work with other devices such as smartphones.

In an embodiment of this application may be applied to any one of the foregoing communications systems. For example, in an embodiment of this application may be applied to an LTE system and a subsequent evolved system such as 5G, or other wireless communications systems using various radio access technologies, for example, a system using an access technology such as code division multiple access, frequency division multiple access, time division multiple access, orthogonal frequency division multiple access, or single-carrier frequency division multiple access, especially applicable to a scenario in which a channel information feedback is required and/or a two-stage precoding technology is applied, for example, a wireless network to which a large-scale antenna array (massive multiple-input multiple-output, Massive MIMO) technology is applied, or a wireless network to which a distributed antenna technology is applied.

FIG. 1 is a schematic diagram of a scenario of a communications system to which an embodiment of this application is applicable. As shown in FIG. 1, the communications system 100 includes a network device 102 and a plurality of terminal devices (such as a terminal device 116 and a terminal device 122). The network device 102 may provide a communications service for the terminal device and access a core network. The terminal device accesses the network by searching for a synchronization signal, a broadcast signal, or the like that is sent by the network device, to communicate with the network, for example, perform uplink/downlink transmission.

In an embodiment, the network device 102 may include a plurality of antenna groups. Each antenna group may include a plurality of antennas. For example, one antenna group may include antennas 104 and 106, another antenna group may include antennas 106 and 110, and an additional group may include antennas 112 and 114. FIG. 1 shows two antennas for each antenna group. However, each group may include more or fewer antennas. The network device 102 may additionally include a transmitter chain and a receiver chain, and a person of ordinary skill in the art may understand that both of them may include a plurality of components (for example, a processor, a modulator, a multiplexer, a demodulator, a demultiplexer, and an antenna) related to signal sending and receiving.

The network device 102 may communicate with a plurality of terminal devices (for example, the terminal device 116 and the terminal device 122). However, it may be understood that the network device 102 may communicate with any quantity of terminal devices that are similar to the terminal device 116 or 122.

As shown in FIG. 1, the terminal device 116 communicates with the antennas 112 and 114. The antennas 112 and 114 send information to the terminal device 116 through a forward link 116, and receive information from the terminal device 116 through a reverse link 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (FDD) system, for example, the forward link 116 may use a frequency band different from that used by the reverse link 120, and the forward link 124 may use a frequency band different from that used by the reverse link 126.

For another example, in a time division duplex (TDD) system and a full duplex system, the forward link 116 and the reverse link 120 may use a same frequency band, and the forward link 124 and the reverse link 126 may use a same frequency band.

Each antenna group and/or area designed for communication is referred to as a sector of the network device 102. For example, an antenna group may be designed to communicate with a terminal device in the sector within coverage of the network device 102. In a process in which the network device 102 communicates with the terminal devices 116 and 122 through the forward links 116 and 124 respectively, a transmit antenna of the network device 102 may improve signal-to-noise ratios of the forward links 116 and 124 through beamforming. In addition, in comparison with a manner in which the network device sends, by using a single antenna, a signal to all terminal devices served by the network device, a manner in which the network device 102 sends, through beamforming, a signal to the terminal devices 116 and 122 that are randomly distributed within related coverage causes less interference to a mobile device in a neighboring cell.

In a given time, the network device 102, the terminal device 116, or the terminal device 122 may be a wireless communications sending apparatus and/or a wireless communications receiving apparatus. When sending data, the wireless communications sending apparatus may encode the data for transmission. In an embodiment, the wireless communications sending apparatus may obtain (for example, generate, receive from another communications apparatus, or store in a memory) a particular quantity of data bits to be sent on a channel to the wireless communications receiving apparatus. The data bit may be included in a transport block (or a plurality of transport blocks) of the data, and the transport block may be segmented to generate a plurality of code blocks.

In addition, the communications system 100 may be a public land mobile network PLMN network, a device-to-device (D2D) network, a machine-to-machine (M2M) network, or another network. FIG. 1 is merely an example of a simplified schematic diagram for ease of understanding, and the network may further include another network device that is not shown in FIG. 1.

As described above, the network device and the terminal device need to perform beam training to enable a receive beam and a transmit beam to match each other. However, in the current technology, beam training efficiency is relatively low.

In an embodiment, information such as a capability of the terminal device is not considered in an existing standard, and the existing standard stipulates that a terminal device can perform training in only one frequency band on the carrier at a time. Therefore, in this manner, the terminal device needs to perform a time division operation to complete training in a plurality of frequency bands on the carrier. Consequently, a training time is excessively long, and training efficiency is relatively low.

In embodiment of this application provides a beam training method. In the method, at least one frequency band can be selected based on a capability of a terminal device to perform beam training, so that training efficiency can be improved. In an embodiment of this application, the terminal device may report capability indication information indicating the capability of the terminal device. In other words, the capability indication information may be used to indicate that the terminal device can support simultaneous beam training in a maximum of N frequency bands. In this way, the network device may select a plurality of frequency bands at a time based on the capability of the terminal device to simultaneously perform beam training.

Therefore, in an embodiment of this application, when the quantity N, of frequency bands for simultaneous training, supported by the terminal device is greater than 1, beam training may be simultaneously performed between the network device and the terminal device in a plurality of frequency bands. In addition, in this embodiment of this application, the quantity of frequency bands for training is not reduced. Therefore, in this embodiment of this application, beam training efficiency can be improved while training accuracy can be ensured.

For ease of understanding and description, by way of example but not limitation, the following describes an execution process and action of the beam training method used in the application in the communications system.

First, to make the method in the embodiments of this application easier to understand, some concepts in the embodiments of this application are described below.

It should be understood that, in an embodiment of this application, a carrier (CC) indicates a frequency domain width occupied by an orthogonal frequency division multiplexing (OFDM) symbol.

In an embodiment of this application, a beam (beam former) may also be referred to as a spatial domain filter, a transmit beam may also be referred to as a spatial domain transmission filter, and a receive beam may also be referred to as a spatial domain receive filter.

In an embodiment, the beam in the embodiments of this application may be a wide beam, a narrow beam, or a beam of another type. In the application, a beam forming technology may be a beamforming technology or another technical means. For example, the beamforming technology may be a digital beamforming technology, an analog beamforming technology, or a hybrid digital/analog beamforming technology. A transmit end may send same information or different pieces of information by using different beams. In an embodiment, a plurality of beams having a same or similar communication feature may be considered as one beam. One beam may include one or more antenna ports, to transmit a data channel, a control channel, a sounding signal, and the like. In this application, the transmit beam may be signal strength distribution formed in different directions in space after a signal is transmitted by using an antenna, and the receive beam may be signal strength distribution in different directions in space of a radio signal received from an antenna. It may be understood that, one or more antenna ports forming one beam may also be considered as one antenna port set. The beam may be represented as a spatial domain filter in a protocol.

Beam training indicates a process in which the network device and the terminal device search for a receive/transmit beam pair that matches each other. For a definition of beam training, refer to descriptions in an existing standard. Details are not described again in the embodiments of this application.

In an embodiment of this application, performing beam training in a frequency band may also be referred to as performing beam management, beam tracking, or the like in the frequency band. A process of performing beam training in the frequency band may indicate a process of searching for a best receive/transmit beam pair in the frequency band by a receive end and a transmit end. For example, in an implementation, the terminal device measures a transmit beam of the network device, and feeds back a reference signal received power (RSRP), for example, a layer 1 reference signal received power (L1-RSRP) in NR. The base station uses a transmit beam corresponding to a maximum value of the L1-RSRP as a best transmit beam and feeds back the transmit beam. Similarly, the terminal device calculates an L1-RSRP by changing a receive beam of the terminal device, to select a receive beam corresponding to a maximum value of the L1-RSRP as a best receive beam corresponding to a transmit beam. The foregoing best transmit beam and best receive beam constitute the foregoing best transmit and receive beam pair, to perform subsequent channel state information CSI measurement and/or data transmission.

Figure 2:
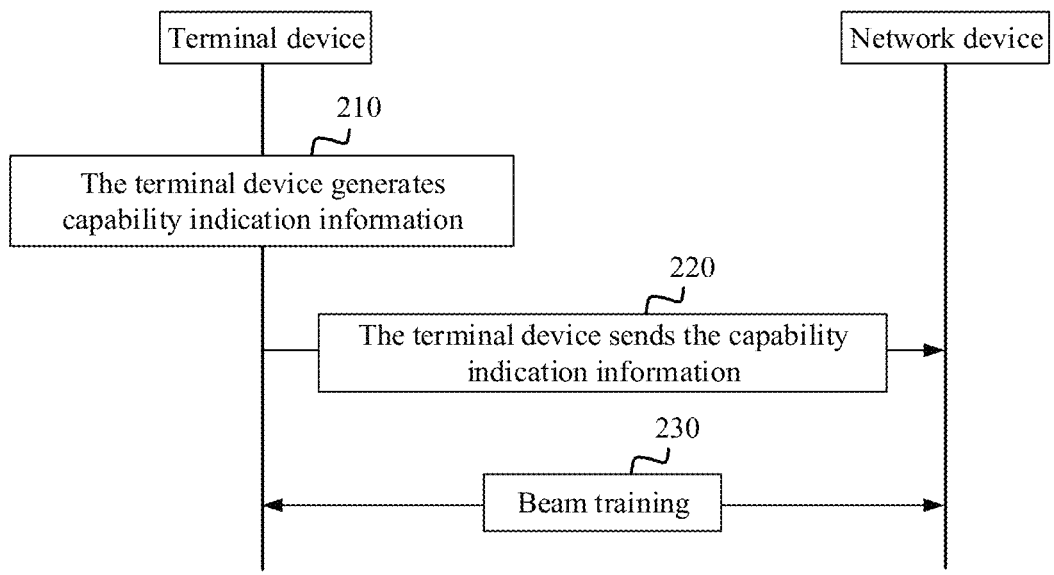
FIG. 2 is a schematic flowchart of a beam training method according to this application.

The following describes a beam training method in an embodiment of this application with reference to FIG. 2. FIG. 2 is a schematic flowchart of a beam training method according to an embodiment of the application. The method shown in FIG. 2 is described from a perspective of interaction between a network device and a terminal device. FIG. 2 shows a method in this embodiment of this application in a downlink transmission scenario. In an embodiment, the method 200 shown in FIG. 2 includes the following operations:

210. A terminal device generates capability indication information, where the capability indication information is used to indicate that the terminal device can support simultaneous beam training in a maximum of N frequency bands, and N is an integer greater than or equal to 1.

In an embodiment, the terminal device may generate the capability indication information based on a default configuration, for example, but not limited to, a capability of receiving beams by the terminal device, an RSRP calculation capability, and the like. This embodiment of this application is not limited thereto.

In an embodiment of this application, the frequency band indicates a segment of continuous frequency domain resources. For example, the frequency band may be a bandwidth part (BWP). The BWP may be understood as a segment of continuous frequency bands. The frequency band includes at least one continuous sub-band. Each bandwidth part may correspond to a group of numerologies, including, for example, but not limited to, a subcarrier spacing, a cyclic prefix (CP) length, a transmission time interval (TTI), a quantity of symbols, a resource block (RB) location, a slot length, and a frame format. In this embodiment of this application, different bandwidth parts may correspond to different numerologies. For a definition of the bandwidth part, refer to the current technology, for example, but not limited to, various proposals for NR. As the technology continuously develops, the foregoing definition may also change.

In an embodiment, the frequency band may alternatively be a beam tracking band.

It should be understood that, in an embodiment of this application, the beam tracking band may include at least one subcarrier. In an embodiment, the beam tracking band may include at least one resource block (RB) in frequency domain. Alternatively, the beam tracking band may include at least one precoding group PRG) in frequency domain. Alternatively, the beam tracking band may include at least one resource block group (RBG) in frequency domain.

In an embodiment of this application, only a signal used for beam training can be scheduled in the beam tracking band. Alternatively, only a signal and a control channel (for example, a physical downlink control channel (PDCCH)) that are used for beam training can be scheduled in the beam tracking band. In an embodiment, signals used for beam training and scheduled between different beam tracking bands may be different.

For ease of description, the following uses merely an example in which the frequency band is a BWP for description. However, this embodiment of this application is not limited thereto. For a case in which the frequency band is a beam tracking band, refer to the description in which the frequency band is the BWP.

In an embodiment, the N frequency bands belong to a same carrier CC.

In an embodiment, the CC includes a frequency domain width occupied by one orthogonal frequency division multiplexing OFDM symbol.

In an embodiment this application, on a same CC, on a same OFDM symbol, the terminal device expects, by using capability indication information, to simultaneously perform beam training in different frequency bands (for example, BWPs). In an embodiment, the terminal device expects that a respective independent spatial domain filter (downlink spatial domain transmission filter) may be used in each BWP. Different downlink spatial domain filters or a same downlink spatial domain filter may be used for signals that are used for beam training and are transmitted in different BWPs.

Figure 3:
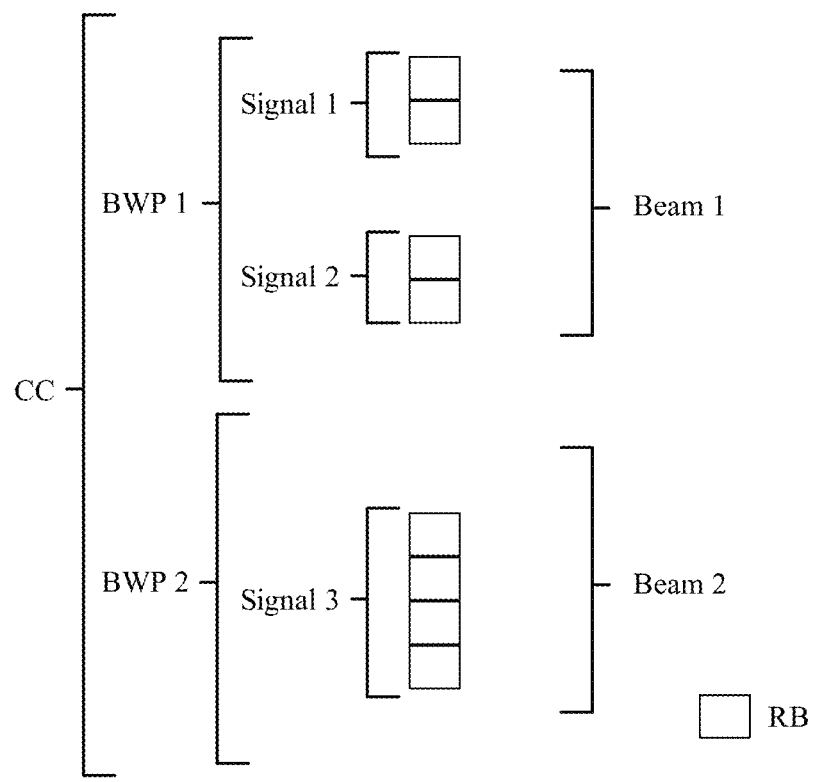
FIG. 3 is a schematic diagram of a carrier according to this application.

For example, as shown in FIG. 3, a same CC includes a BWP 1 and a BWP 2. The terminal device may report a capability of the terminal device by using the capability indication information. For example, the capability indication information is used to indicate that the terminal device can support simultaneous beam training in a maximum of two frequency bands (that is, N=2). That is, the capability indication information indicates that the terminal device supports simultaneous beam training in the two BWPs. In other words, the terminal device expects that beam training can be simultaneously performed in the two BWPs. In an embodiment, the terminal device expects that signals that are used for beam training and transmitted in the two BWPs may use different downlink spatial domain filters or a same downlink spatial domain filter.

It should be understood that FIG. 3 shows merely an example in which one CC includes two BWPs. However, this embodiment of this application is not limited thereto. In an actual application, one CC may include a plurality of BWPs. For example, one CC includes three BWPs, four BWPs, and the like.

It should be understood that, in an embodiment of this application, during beam training, a signal used for beam training and transmitted in the frequency band may be at least one type of signal in the following signals: an aperiodic channel state information reference signal (A-CSI-RS), a periodic channel state information reference signal (periodic channel state information reference signal, P-CSI-RS), a semi-persistent channel state information reference signal (SP-CSI-RS), and a synchronization signal/broadcast channel (PBCH) block (SSB).

In an embodiment of this application, the A-CSI-RS, the P-CSI-RS, and the SP-CSI-RS may be collectively referred to as a channel state information reference signal (CSI-RS). In other words, in this embodiment of this application, the signal used for beam training and transmitted in the frequency band may be at least one type of signal in a CSI-RS and an SSB.

It should be understood that the signal used for beam training in this embodiment of this application may alternatively be another signal. This embodiment of this application is not limited thereto.

For whether to distinguish between types of signals transmitted in the frequency band, the capability indication information in this embodiment of this application is described in the following two cases.

Case 1: For different signals, in this embodiment of this application, the terminal device may not distinguish between signal types and report only one capability. In other words, signals used for beam training and transmitted in the frequency band all correspond to the same capability.

It should be understood that the "capability" in this specification is a capability that the terminal device can support simultaneous beam training in a plurality of frequency bands. One capability corresponds to one capability value. For example, a capability value N corresponding to one capability indicates that the terminal device can support simultaneous beam training in a maximum of N frequency bands.

Case 2: The terminal device distinguishes between signal types, and needs to report a plurality of capabilities for a plurality of signals, where different signals of the plurality of signals may correspond to a same capability value or different capability values. In other words, capability values corresponding to the plurality of capabilities corresponding to the plurality of signals may be the same or may be different. It should be understood that a capability value corresponding to the first signal may indicate a maximum quantity, of frequency bands (herein, the frequency band is a frequency band in which the first signal is transmitted) for simultaneous beam training, supported by the terminal device.

The following separately describes the two cases in detail.

In an embodiment, the case 1 is a case in which the terminal device does not distinguish between signal types, and reports only one capability.

In an embodiment, in 210, signal types may not be distinguished for the capability indication information. In this case, during actual beam training, a signal transmitted in each of a plurality of frequency bands in which beam training is simultaneously performed is not limited. For example, the signal transmitted in each frequency band may be any one or more of an A-CSI-RS, a P-CSI-RS, an SP-CSI-RS, and an SSB. Alternatively, the signal transmitted in each frequency band may be one or both of a CSI-RS and an SSB. This embodiment of this application is not limited thereto.

In other words, a capability reported by the terminal device is not limited by a signal type. After reporting the capability indication information, the terminal device does not expect that a quantity of scheduled BWPs in which simultaneous L1-RSRP measurement and calculation are performed exceeds the capability value N. That is, the maximum quantity of BWPs expected by the terminal device to simultaneously perform L1-RSRP measurement and calculation is N.

It should be understood that each of a plurality of frequency bands in which beam training is simultaneously performed corresponds to one beam, and two different frequency bands in the plurality of frequency bands may correspond to different beams or may correspond to a same beam. This embodiment of this application is not limited thereto.

In an embodiment of this application, in each frequency band (for example, a BWP) on an OFDM symbol, all CSI-RS resources in one CSI-RS resource set or all CSI-RS resources in a same CSI-RS resource setting use a same beam (or referred to as a downlink spatial domain filter).

In an embodiment, for a definition of the CSI-RS resource set or the CSI-RS resource setting, refer to descriptions in an existing standard. Details are not described again in the embodiments of this application.

For example, as shown in FIG. 3, during beam training, a signal 1 and a signal 2 may be transmitted in the BWP 1, and a signal 3 may be transmitted in the BWP 2. It should be understood that in this embodiment of this application, each BWP may include at least one resource block (RB). For example, the BWP 1 includes four RBs, the signal 1 is carried on two RBs, and the signal 2 is carried on the other two RBs; the BWP 2 includes four RBs, and the signal 3 is carried on the four RBs. The signal 1 and the signal 2 belong to a same CSI-RS resource, a same CSI-RS resource set, or a same CSI-RS resource setting. It can be learned from the foregoing description that the signal 1 and the signal 2 correspond to a same beam. For example, both of the signal 1 and the signal 2 correspond to a beam 1. A beam 2 corresponding to the signal 3 may be the same as or different from the beam 1. The signal 1 and the signal 2 may be signals of a same type, for example, CSI-RSs of a same type. For example, the CSI-RSs of the same type are P-CSI-RSs, A-CSI-RSs, or SP-CSI-RSs. The signal 3 may be any type of signal used for beam training described above, for example, a P-CSI-RS, an A-CSI-RS, or an SP-CSI-RS.

In an embodiment, in the case 1, the capability indication information may include a value of N. That is, the capability indication information includes the capability value N of the terminal device.

That is, the terminal device may directly report the capability value N by using the capability indication information.

In this case, the network device may directly determine the capability value of the terminal device based on obtained capability indication information. Further, the network device may determine a quantity of frequency bands for simultaneous beam training. It should be understood that the quantity, of frequency bands for simultaneous beam training, determined by the network device is usually less than or equal to a capability value reported by the terminal device.

Therefore, in an embodiment of this application, the terminal device reports the capability value, so that the network device can directly determine a capability of the terminal device based on the capability value, and no additional calculation process is required. This can reduce calculation overheads.

In an embodiment, in the case 1, the capability indication information includes first indication information and second indication information. The first indication information is used to indicate a maximum quantity x, of frequency bands that are simultaneously in an active state, supported by the terminal device. The second indication information is used to indicate a maximum quantity y, of analog beams, panels, or simultaneous spatial domain receive filters that are used for receiving, supported by the terminal device. x and y are used to determine a value of N.

x may be a maximum quantity, of frequency bands for simultaneous channel state information (CSI) measurement, supported by the terminal device and/or a maximum quantity, of frequency bands used for data transmission, supported by the terminal device.

In other words, the terminal device reports x and y by using the capability indication information, to indirectly indicate the capability value of the terminal device. That is, the terminal device indirectly reports the capability value by using the capability indication information.

In this case, the network device needs to calculate and determine a capability value of the terminal device based on capability information reported by the terminal device, that is, x and y.

In an embodiment, N is a smaller value in x and y.

In other words, x>y, and N=y; or x<=y, and N=x.

Further, the terminal device may further report, by using the capability indication information, whether a single spatial domain receive filter is supported. The single spatial domain receive filter may also be referred to as an omnidirectional filter. If the terminal device reports that a single spatial domain filter is supported, that is, if the terminal device has an omnidirectional receive beam capability, a value of y may be ignored when the value of N is determined, that is, N=x. Alternatively, in this case, the terminal device may not need to report a value of y, that is, the terminal device reports a value of x and supports a single spatial domain filter by using the capability indication information; in this case, N=x.

In an embodiment, if the terminal device reports that a single spatial domain receive filter is not supported or does not report whether a single spatial domain filter is supported, it may be considered that the terminal device does not have an omnidirectional receive beam capability. In this case, a value of y is not ignored when the value of N is determined, and the value of N is still calculated based on N=min(x, y).

In an embodiment, if the terminal device does not report whether a single domain receive spatial filter is supported, it may also be considered that the terminal device has an omnidirectional receive beam capability, and a value of y may be ignored when the value of N is determined; in this case, N=x. Alternatively, in this case, the terminal device may not need to report a value of y. That is, the terminal device reports a value of x by using the capability indication information. In this case, N=x.

Therefore, in an embodiment of this application, the terminal device may indirectly report a capability of the terminal device by using existing information, and does not need to report the capability value of the terminal device. This can reduce signaling overheads and save network resources.

The following describes the case 2 in which the terminal device needs to distinguish between signal types to report a plurality of capabilities.

In other words, in the case 2, a capability reported by the terminal device is limited by a signal type. For example, the terminal device respectively reports capabilities for different signals, or uses some signals as a set, considers the signals as a whole, and reports one capability.

In an embodiment, the capability indication information is used to indicate that the terminal device can support simultaneous beam training in a maximum of $n_i$ frequency bands for an $i^{th}$ signal set in m signal sets, where i represents a number of a signal set, i traverses values 1, 2, . . . , and m, m represents a quantity of the signal sets, $n_i$ is an integer greater than or equal to 1, m is an integer greater than or equal to 1, N is a maximum value of $n_i$, the $i^{th}$ signal set includes at least one signal, and a maximum quantity, of frequency bands for beam training, that can be supported by the terminal device for each signal in the at least one signal is $n_i$.

In an embodiment, $n_i$ may represent a maximum quantity of frequency bands used by the terminal device to simultaneously perform beam training based on each signal in the $i^{th}$ signal set. For example, the $i^{th}$ signal includes a signal 1 and a signal 2. In this case, a maximum quantity of frequency bands used by the terminal device to simultaneously perform beam training based on the signal 1 is $n_i$, and a maximum quantity of frequency bands used by the terminal device to simultaneously perform beam training based on the signal 2 is $n_i$.

Further, in an embodiment of this application, the $i^{th}$ signal set may be considered as a whole, and $n_i$ may also represent a maximum quantity of frequency bands used by the terminal device to simultaneously perform beam training based on all signals in the $i^{th}$ signal set. For example, the $i^{th}$ signal includes the signal 1 and the signal 2. In this case, a maximum quantity of frequency bands used by the terminal device to simultaneously perform beam training based on the $i^{th}$ signal set is $n_i$. In other words, during beam training of the terminal device, a sum of all frequency bands carrying the signals in the $i^{th}$ signal set is not greater than $n_i$.

In an embodiment of this application, frequency bands corresponding to all the sets belong to a same CC.

In an embodiment, the terminal device may divide a plurality of signals used for beam training into at least one signal set based on types of signals used for beam training, and then set one capability value for each signal set. Signals in one signal set have a same attribute or similar attributes. For example, the signals are all CSI-RSs, and the like. In this case, capability values corresponding to different signal sets may be the same or may be different. This embodiment of this application is not limited thereto.

In an embodiment, the terminal device may classify signals whose capability values are equal or close to each other into a signal set based on capability values corresponding to the signals used for beam training, and then set a capability value for each signal set. In this case, different signal sets may correspond to different capability values.

It should be understood that in this embodiment of this application, the terminal device may also divide the signals used for beam training into at least one signal set in another manner. This embodiment of this application is not limited thereto.

In an embodiment, different signal sets in the m signal sets include different signals, and the $i^{th}$ signal set includes at least one type of signal in a channel state information reference signal CSI-RS and a synchronization signal/broadcast channel block SSB.

Further, in an embodiment, the CSI-RS includes at least one type of signal in an aperiodic channel state information reference signal A-CSI-RS, a periodic channel state information reference signal P-CSI-RS, and a semi-persistent channel state information reference signal SP-CSI-RS.

In other words, the $i^{th}$ signal set includes at least one type of signal in the A-CSI-RS, the P-CSI-RS, the SP-CSI-RS, and the SSB.

It should be noted that, in this embodiment of this application, a set of signals used for beam training may be referred to as a preset signal set. For example, the preset signal set includes an A-CSI-RS, a P-CSI-RS, an SP-CSI-RS, and an SSB. Alternatively, the preset signal set includes a CSI-RS and an SSB.

It should be understood that the preset signal set in this embodiment of this application may represent a set of signals used for beam training in an actual beam training process. Certainly, the signals used for beam training during actual application are not limited to the foregoing several types of signals listed in this embodiment of this application. During actual application, signals (a preset signal set) used for beam training may include only some of the foregoing signals, or signals (a preset signal set) used for beam training may further include another signal. This embodiment of this application is not limited thereto.

It should be understood that the preset signal set may also be referred to as a signal set, a first set, or the like used for beam training. This embodiment of this application is not limited thereto.

It should be understood that signals in the m signal sets may include all signals in the preset signal set, or may include only some signals in the preset signal set. This embodiment of this application is not limited thereto.

The following describes a case in which the signals in the m signal sets include all the signals in the preset signal set.

For example, in an embodiment, each set includes only one signal. In other words, a capability is reported for each signal by the network device.

A capability corresponding to one signal indicates a maximum quantity, of frequency bands for simultaneous beam training, that can be supported by the terminal device for the signal.

In an embodiment, in the case 2, the capability indication information includes a value of That is, the capability indication information includes m capability values corresponding to the m signal sets.

For example, when each signal set includes one signal, the $i^{th}$ signal set may also be referred to as an $i^{th}$ signal. That is, when the network device reports one capability for each signal, the capability indication information may include m capability values corresponding to m signals.

For example, the preset signal set includes an A-CSI-RS, a P-CSI-RS, an SP-CSI-RS, and an SSB; m=4, and each signal set includes one of the SSB, the P-CSI-RS, the SP-CSI-RS, and the A-CSI-RS. For example, a first signal set includes an SSB, a second signal set includes a P-CSI-RS, a third signal set includes an SP-CSI-RS, and a fourth signal set includes an A-CSI-RS.

In this case, the capability indication information includes values of $n_1$ to $n_4$. In an embodiment, the capability indication information is used to indicate:

the terminal device can support simultaneous beam training in a maximum of $n_1$ frequency bands for the SSB (the first signal set or the first signal);

the terminal device can support simultaneous beam training in a maximum of $n_2$ frequency bands for the P-CSI-RS (the second signal set or the second signal);

the terminal device can support simultaneous beam training in a maximum of $n_3$ frequency bands for the SP-CSI-RS (the third signal set or the third signal); and the terminal device can support simultaneous beam training in a maximum of $n_4$ frequency bands for the A-CSI-RS (the fourth signal set or the fourth signal).

In other words, after reporting the capability indication information, during beam training, the terminal device:

does not expect that a quantity of scheduled BWPs in which simultaneous SSB-based L1-RSRP measurement and calculation are performed exceeds $n_1$;

does not expect that a quantity of scheduled BWPs in which simultaneous P-CSI-RS-based L1-RSRP measurement and calculation are performed exceeds $n_2$;

does not expect that a quantity of scheduled BWPs in which simultaneous SP-CSI-RS-based L1-RSRP measurement and calculation are performed exceeds $n_3$; and does not expect that a quantity of scheduled BWPs in which simultaneous A-CSI-RS-based L1-RSRP measurement and calculation are performed exceeds $n_4$.

In other words, during beam training, the terminal device expects: the quantity of BWPs in which simultaneous SSB-based L1-RSRP measurement and calculation are performed does not exceed $n_1$;

the quantity of BWPs in which simultaneous P-CSI-RS-based L1-RSRP measurement and calculation are performed does not exceed $n_2$;

the quantity of BWPs in which simultaneous SP-CSI-RS-based L1-RSRP measurement and calculation are performed does not exceed $n_3$; and the quantity of BWPs in which simultaneous A-CSI-RS-based L1-RSRP measurement and calculation are performed does not exceed $n_4$.

It should be noted that when each signal corresponds to one capability value, capability values corresponding to different signals may be the same or different. The foregoing describes a case in which the terminal device reports one capability value for each signal. Alternatively, in an implementation, when capability values corresponding to some signals are equal, the terminal device may report a capability value of only one signal for the some signals, and indicate that capability values of remaining signals are equal to the capability value of the signal. For example, there are four types of signals, namely, a first signal to a fourth signal. When capability values corresponding to the first signal and the second signal are equal, the terminal device reports only capability values corresponding to the first signal, the third signal, and the fourth signal, and indicates that the capability value corresponding to the second signal is equal to the capability value corresponding to the first signal. In this way, only one capability value is reported for a plurality of signals whose capability values are equal in this embodiment of this application. This reduces signaling overheads and improves network performance.

In an embodiment of this application, for the foregoing case, the first signal and the second signal may be considered as a set, the third signal may be considered as a set, and the fourth signal may be considered as a set. In other words, in this case, m=3. For the first signal to the fourth signal, the terminal device needs to indicate, by using the capability indication information, only three capability values, that is, the capability value corresponding to the first signal and the second signal (the first signal set), the capability value corresponding to the third signal (the second signal set), and the capability value corresponding to the fourth signal (the third signal set).

The following describes several special signal sets of signal sets.

For example, in an embodiment, one signal set, for example, the first signal set, in the m signal sets includes a P-CSI-RS, an SP CSI-RS, and an A CSI-RS. Signals in the first signal set are all CSI-RSs.

Therefore, in an embodiment, for the first signal set, the capability indication information may be described as being used to indicate that the terminal device can support, for the CSI-RS (the first signal set), simultaneous beam training in a maximum of $n_1$ frequency bands.

In other words, after reporting the capability indication information, during beam training, the terminal device does not expect that a quantity of scheduled BWPs in which simultaneous CSI-RS-based L1-RSRP measurement and calculation are performed exceeds $n_1$. In other words, the terminal device expects that the quantity of BWPs in which simultaneous CSI-RS-based L1-RSRP measurement and calculation are performed is not greater than $n_1$.

It should be understood that $n_1$ herein may indicate that for each type of CSI-RS, a maximum quantity of frequency bands used by the terminal device to simultaneously perform beam training is $n_1$. Further, $n_1$ may further indicate that CSI-RS types are not distinguished, CSI-RSs of all types are considered as a set, and a maximum quantity of frequency bands used by the terminal device to simultaneously perform beam training is $n_1$. In other words, a sum of all frequency bands carrying CSI-RSs (where the CSI-RS may be a P-CSI-RS, an SP CSI-RS, or an A CSI-RS) during beam training of the terminal device is not greater than $n_1$.

For another example, in an embodiment, one signal set, such as the first signal set, in the m signal sets includes a P-CSI-RS and an SP CSI-RS. Signals in the first signal set are all periodic CSI-RSs.

Therefore, in this case, for the first signal set, the capability indication information may be described as being used to indicate that the terminal device can support, for the periodic CSI-RS (the first signal set), simultaneous beam training in a maximum of $n_1$ frequency bands.

In other words, after reporting the capability indication information, during beam training, the terminal device does not expect that a quantity of scheduled BWPs in which simultaneous periodic CSI-RS-based L1-RSRP measurement and calculation are performed exceeds $n_1$. In other words, the terminal device expects that the quantity of BWPs in which simultaneous periodic CSI-RS-based L1-RSRP measurement and calculation are performed is not greater than $n_1$.

It should be understood that $n_1$ herein may indicate that for each type of periodic CSI-RS, a maximum quantity of frequency bands used by the terminal device to simultaneously perform beam training is $n_1$. Further, $n_1$ may further indicate that periodic CSI-RS types are not distinguished, periodic CSI-RSs of all types are considered as a set, and a maximum quantity of frequency bands used by the terminal device to simultaneously perform beam training is $n_1$. In other words, a sum of all frequency bands carrying periodic CSI-RSs (where the periodic CSI-RS may be a P-CSI-RS or an SP CSI-RS) during beam training of the terminal device is not greater than $n_1$.

It should be noted that the case 1 may be considered as a special case of the case 2. For example, when the terminal device considers all signals as a set and reports only one capability, the case 2 is the same as the case 1.

In this case, m=1, and the capability indication information may include only a capability value corresponding to the set, for example, $n_1$. Alternatively, similar to that in the case 1 above, in this case, the capability indication information includes first indication information and second indication information. The first indication information is used to indicate a maximum quantity x, of frequency bands that are simultaneously in an active state, supported by the terminal device. The second indication information is used to indicate a maximum quantity y, of analog beams, panels, or spatial domain receive filters that are simultaneously used for receiving, supported by the terminal device. x and y are used to determine a value of $n_1$. Both x and y are integers greater than or equal to 1. In this case, reference may be made to the description in the foregoing case 1, provided that N above is replaced with $n_1$. Details are not described herein again.

The following describes a case in which the signals in the m signal sets include some signals in the preset signal set.

In an embodiment, the m signal sets include some signals in the preset signal set in total. A quantity of frequency bands corresponding to each of other signals than some signals in the preset signal set is equal to $n_i$ corresponding to a signal set in which a signal with a highest priority in the some signals is located. A quantity of frequency bands corresponding to one signal indicates a maximum quantity of frequency bands used by the terminal device to simultaneously perform beam training based on the signal.

For example, sequences of priorities of the signals are an SSB, a P-CSI-RS, an SP-CSI-RS and an A-CSI-RS in descending order.

Assuming that the signals in the m signal sets do not include the SSB but include the P-CSI-RS, a capability value corresponding to the SSB is equal to a capability value corresponding to the P-CSI-RS.

Assuming that the signals in the m signal sets do not include the SSB and the P-CSI-RS, but include the SP-CSI-RS, capability values corresponding to the SSB and the P-CSI-RS are equal to a capability value corresponding to the SP-CSI-RS.

Assuming that signals in the m signal sets do not include the SSB, the P-CSI-RS, and the SP-CSI-RS, but include the A-CSI-RS, capability values corresponding to the SSB, the P-CSI-RS, the SP-CSI-RS are equal to a capability value corresponding to the A-CSI-RS.

A case in which the signals in the m signal sets do not include another signal is similar to a case in which the signals in the m signal sets do not include the SSB. Cases are not listed one by one herein.

The foregoing describes a case in which when the capability indication information does not indicate a capability value corresponding to a signal, the capability value corresponding to the signal may be determined based on a priority of the signal. However, this embodiment of this application is not limited thereto. For example, when the capability indication information does not indicate a capability value corresponding to the SSB, the capability value corresponding to the SSB may alternatively be one of the following two values: a capability value corresponding to a CSI-RS, and a capability value corresponding to the periodic CSI-RS.

In an embodiment, when the capability indication information does not indicate a capability value corresponding to the A-CSI-RS, the capability value corresponding to the A-CSI-RS may be a capability value corresponding to the periodic CSI-RS.

In an embodiment of this application, the capability indication information is used to indicate capability values of only some signals. This can reduce signaling overheads.

220. The terminal device sends the capability indication information.

Correspondingly, the network device receives the capability indication information.

230. The network device indicates, based on the capability indication information, the terminal device to perform beam training.

In an embodiment, the network device may determine at least one frequency band based on the received capability indication information, and indicate the terminal device to perform beam training in the at least one frequency band. A quantity of the at least one frequency band determined by the network device is less than or equal to the capability value indicated by the capability indication information reported by the terminal device.

For example, the network device generates indication information (where the indication information may also be referred to as configuration information) based on the capability indication information, and sends the indication information to the terminal device, to indicate the terminal device to perform beam training.

In an embodiment, the indication information may be used to indicate a type of a signal used for beam training. For example, the signal used for beam training is a CSI-RS (where for example, the CSI-RS may be a P-CSI-RS, an SP-CSI-RS, or an A-CSI-RS) or an SSB. Further, when the signal used for beam training is the CSI-RS, the indication information may be further used to indicate at least one of the following information: a quantity of frequency bands used by the terminal device to simultaneously perform beam training, indexes of the frequency bands used by the terminal device to simultaneously perform beam training, identifiers of the frequency bands used by the terminal device to simultaneously perform beam training, a time-frequency resource location of the signal used for beam training, a time domain resource offset of the signal used for beam training, a periodicity of the signal used for beam training, and the like. Optionally, the indication information may further indicate the terminal device not to report a measurement result of a beam. Alternatively, the indication information may further indicate the terminal device to report a measurement result. In an embodiment, the indication information may indicate the terminal device to report at least one of the following information: information such as L1-RSRP of a signal, an index of a signal, and an index of a frequency band. The index of the signal may be, for example, a channel state information reference signal resource indicator (CRI). This embodiment of this application is not limited thereto.

For the case 1 above, the at least one frequency band is L frequency bands. In other words, in 230, the network device indicates, based on the capability indication information, the terminal device to simultaneously perform beam training in the L frequency bands, where L is an integer less than or equal to N.

In an embodiment, the terminal device calculates layer 1 reference signal received powers L1-RSRPs of signals transmitted in the L frequency bands or on L beams.

In an embodiment, a value of L may be determined by the network device based on factors such as a capability of the network device and/or a measurement requirement of the terminal device. This embodiment of this application is not limited thereto. It should be understood that, in this specification, the capability of the network device may indicate a capability that can be supported by the network device and that is of a quantity of BWPs in which beam training can be simultaneously performed. The measurement requirement of the terminal device may indicate a requirement that is of a quantity of BWPs needing to be used by the terminal device to simultaneously perform training and that is determined by the network device based on a factor such as a network status. It should be understood that, definitions of a capability of the network device and a measurement requirement of the terminal device in the following are similar thereto, and are not described one by one in the following.

It should be understood that, during beam training, in an embodiment of this application, a signal transmitted in each of the L frequency bands is not limited, and the signal transmitted in each frequency band may include at least one signal in the preset signal set.

For the case 2 above, the at least one frequency band includes z frequency bands. In other words, in 230, the network device indicates, based on the capability indication information, the terminal device to simultaneously perform beam training in the z frequency bands N.

In an embodiment, the terminal device calculates L1-RSRPs of first signals simultaneously transmitted in the z frequency bands, where z is an integer not greater than and the first signal is any signal in the $i^{th}$ signal set.

In other words, for a signal in the $i^{th}$ signal set, the network device and the terminal device simultaneously perform beam training in z frequency bands. During actual beam training, a signal used for beam training may not be limited to the signal. Therefore, for all signals used for beam training, the at least one frequency band may be P frequency bands. In other words, in 230, the network device and the terminal device simultaneously perform beam training in the P frequency bands. The P frequency bands include the z frequency bands in which the first signal in the $i^{th}$ signal set is simultaneously transmitted, z is an integer not greater than $n_i$, and the first signal is any signal in the $i^{th}$ signal set.

Further, by way of example and not limitation, in the P frequency bands, a total quantity of frequency bands carrying the signals in the $i^{th}$ signal set is not greater than $n_i$. In other words, during beam training, a total quantity of frequency bands occupied by all signals in the $i^{th}$ signal set is less than or equal to $n_i$. During beam training, for each signal, a quantity of frequency bands in which the signal is transmitted is less than or equal to a capability value corresponding to the signal.

In an embodiment, a value of P and/or z may be determined by the network device based on factors such as a capability of the network device and/or a measurement requirement of the terminal device. This embodiment of this application is not limited thereto.

In an embodiment, P is less than or equal to N. That is, a value of P is less than or equal to a maximum capability value N corresponding to a signal.

In an embodiment of this application, P may also be greater than N. For example, a maximum value of P is $n_1+n_2+ \ldots +n_m$.

Therefore, in an embodiment of this application, the terminal device reports the capability indication information to the network device, so that the network device can simultaneously perform beam training in a plurality of frequency bands based on a capability of the terminal device. In this way, beam training efficiency can be improved in this embodiment of this application.

It should be understood that beam training in this embodiment of this application may include beam training in downlink transmission, for example, training of a downlink transmit beam of the network device and/or a downlink receive beam of the terminal device. In an embodiment, beam training may also include beam training in uplink transmission, for example, training of an uplink receive beam of the network device and/or an uplink transmit beam of the terminal device. This embodiment of this application is not limited thereto.

For example, for transmit beam training of the network device, actual beam training may include but is not limited to the following process: The terminal device may first measure a signal sent by the network device in at least one frequency band, then calculate and search for a better transmit beam that is of the network device and that corresponds to each frequency band, and finally, feed back information about the better transmit beam in each frequency band to the network device.

In an embodiment of this application, in at least one frequency band, for example, in L frequency bands or P frequency bands, on a same CC, beam training may be simultaneously performed, and the terminal device independently measures and calculates an L1-RSRP for each frequency band (for example, a BWP) in the plurality of frequency bands. That is, in this embodiment of this application, the terminal device performs L1-RSRP measurement and calculation based on each BWP. When downlink transmit beam (that is, downlink spatial domain transmission filter) training is performed, the terminal device may feed back a beam training signal index (for example, a CRI) and/or an L1-RSRP in each BWP, so that the network device selects a best transmit beam or best transmit beams in one or more BWPs. When downlink receive beam (that is, a downlink spatial domain receive filter) training is performed, the terminal device may determine, based on an L1-RSRP in each BWP, a best receive beam corresponding to a transmit beam in each BWP. Further, the terminal device may further feed back a beam training signal index (for example, a CRI) and/or an L1-RSRP in each BWP in which a downlink receive beam is trained. Based on downlink transmit beam training and/or downlink receive beam training, the network device may select at least one BWP, to simultaneously perform subsequent channel state information CSI measurement and/or data transmission by using a best transmit beam and a best receive beam in each selected BWP.

In an embodiment, for a training process of the network device and the terminal device in the at least one frequency band, refer to an existing frequency band training process. Details are not described in this specification.

It should be understood that, in this embodiment of this application, after beam training, the network device may select one or more better frequency bands (for example, BWPs) to communicate with the terminal device by using a beam obtained through training. In an embodiment, a network side may configure the one or more BWPs for the terminal device by using radio resource control (RRC) signaling, downlink control information (downlink control information, DCI), or a media access control control element (MAC CE). This embodiment of this application is not limited thereto.

By way of example and not limitation, the following describes a communication process after one or more BWPs for downlink communication are determined: The network device may send a reference signal to the terminal device by using a beam or beams in the one or more BWPs, to perform channel measurement, then receives channel state information (CSI) fed back by the terminal device and/or CSI obtained through channel heterogeneity, and then sends downlink data in the one or more BWPs based on the CSI.

It should be understood that the communication method provided by this application is not limited to downlink transmission, and may also be applicable to uplink transmission. This application imposes no special limitation on a signal for beam training. For example, for downlink data transmission, the reference signal may be, for example, a channel state information reference signal (CSI-RS) and an SSB; for uplink data transmission, a signal used for beam training may be another signal such as a sounding reference signal (SRS). It should be understood that the signals used for beam training listed above are merely an example for description, but should not constitute any limitation on this application. This application does not exclude a possibility of using another signal to implement beam training. For example, this application does not exclude a possibility of defining another signal used for uplink or downlink beam training in an existing protocol (for example, an LTE protocol or an NR protocol) or a future protocol.

The foregoing describes, with reference to FIG. 2, a case in which the terminal device reports a capability of the terminal device, and a method in which the network device determines, based on the capability of the terminal device, to simultaneously perform beam training in a plurality of frequency bands.

Figure 4:
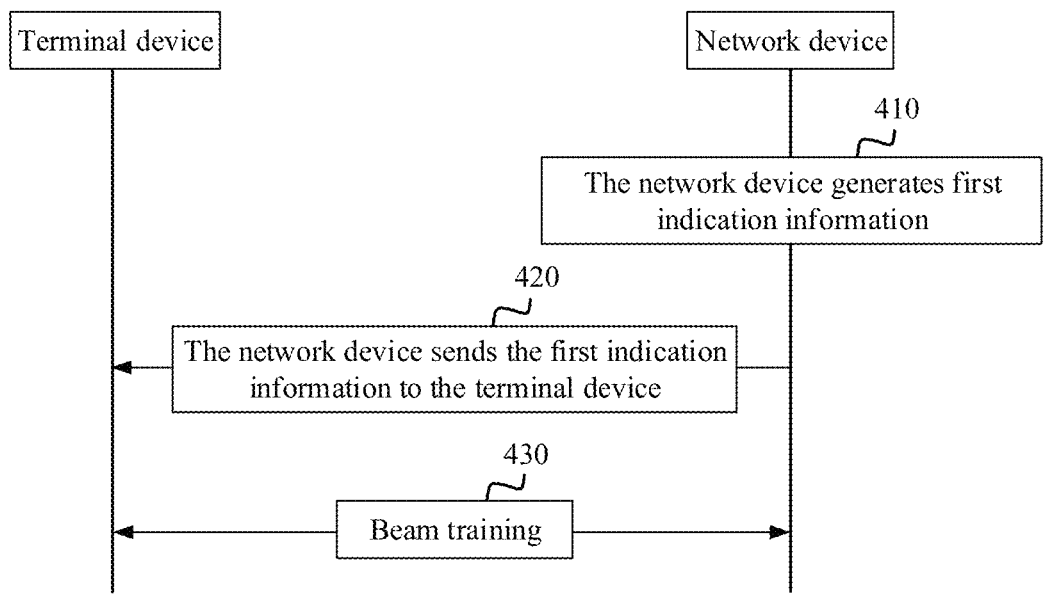
FIG. 4 is a schematic flowchart of another beam training method according to this application.

In an embodiment, the following describes another beam training method according to an embodiment of this application with reference to FIG. 4. The method shown in FIG. 4 is described from a perspective of interaction between a network device and a terminal device. FIG. 4 shows a case in which the network device indicates the terminal device to simultaneously perform beam training in a quantity of frequency bands. In an embodiment, the method 400 shown in FIG. 4 includes the following operations:

410. The network device generates first indication information.

In an embodiment, the first indication information is used to indicate a quantity M of frequency bands in which the terminal device can simultaneously perform beam training, and M is an integer greater than or equal to 1.

It should be understood that, for a definition of "frequency band" in this embodiment of this application, refer to the foregoing description in FIG. 2. Details are not described herein again.

In an embodiment, M represents a maximum quantity of frequency bands in which the terminal device can simultaneously perform beam training.

In other words, the first indication information is used to indicate the maximum quantity M of frequency bands in which the terminal device can simultaneously perform beam training.

During actual beam training, a quantity of frequency bands in which training is simultaneously performed may be less than or equal to M.

In an embodiment, M represents a quantity of frequency bands used when the terminal device performs beam training.

In other words, the first indication information is used to indicate the quantity M of frequency bands in which the terminal device simultaneously performs beam training.

During actual beam training, the terminal device simultaneously performs beam training in the M frequency bands. That is, the network device simultaneously sends, in the M frequency bands, a signal used for beam training, to simultaneously train beams in the M frequency bands.

In an embodiment, the first indication information is generated by the network device based on the capability indication information reported by the terminal device.

In this case, the method further includes:

The terminal device sends the capability indication information to the network device, where the capability indication information is used to indicate that the terminal device can support simultaneous beam training in a maximum of N frequency bands, and N is an integer greater than or equal to 1.

For a description of the capability indication information, refer to the foregoing description in FIG. 2. Details are not described herein again.

In an embodiment, the network device may determine, based on the capability indication information of the terminal device, a capability of the terminal device to support a quantity of frequency bands for simultaneous beam training. Further, the network device determines M based on factors such as a capability of the network device and/or a measurement requirement of the terminal device, and generates the first indication information.

In an embodiment, the first indication information is generated by the network device based on a network status, for example, based on factors such as a capability of the network device and/or a measurement requirement of the terminal device.

420. The network device sends the first indication information to the terminal device.

Correspondingly, the terminal device receives the first indication information.

430. The network device and the terminal device perform beam training based on the first indication information.

In an embodiment, when M represents a maximum quantity of frequency bands in which the terminal device can simultaneously perform beam training, in 430, the network device and the terminal device simultaneously perform beam training in M' frequency bands. In an embodiment, the terminal device simultaneously calculates L1-RSRPs of signals transmitted in the M' frequency bands, where M' is an integer less than or equal to M.

In an embodiment, a value of M' may be determined by the network device based on factors such as a capability of the network device and/or a measurement requirement of the terminal device. This embodiment of this application is not limited thereto.

When M represents a quantity of frequency bands used when the terminal device performs beam training, in 430, the network device and the terminal device simultaneously perform beam training in the M frequency bands.

Therefore, in this embodiment of this application, based on an indication of the network device, beam training may be simultaneously performed between the network device and the terminal device in a plurality of frequency bands, so that beam training efficiency can be improved in this embodiment of this application.

In an embodiment, for a beam training process of the network device and the terminal device, refer to an existing frequency band training process. Details are not described in this specification.

For a communication process after the beam training, refer to the foregoing description. Details are not described herein again.

A person skilled in the art may clearly understand that for ease of description, various numeric numbers such as "first" and "second" in this application are only for distinguishing, and are not intended to limit the embodiments of this application.

It should be understood that, examples in FIG. 1 to FIG. 4 above are merely intended to help a person skilled in the art understand the embodiments of the application, but are not intended to limit the embodiments of the application to a value or a scenario in the examples. A person skilled in the art apparently can make various equivalent modifications or changes according to the examples shown in FIG. 1 to FIG. 4, and such modifications or changes also fall within the scope of the embodiments of the application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the methods of the embodiments of the application with reference to FIG. 2 to FIG. 4. The following describes communications apparatuses of the embodiments of the application with reference to FIG. 5 to FIG. 10.

Figure 5:
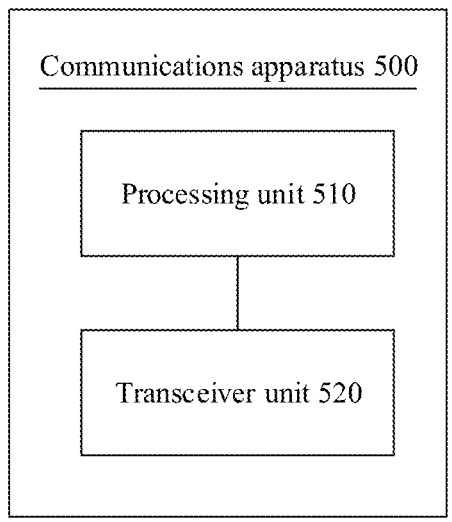
FIG. 5 is a schematic block diagram of a communications apparatus according to this application.

FIG. 5 is a schematic structural diagram of a communications apparatus according to an embodiment of this application. The communications apparatus 500 may include:

a processing unit 510 and a transceiver unit 520.

In an embodiment, the processing unit is configured to generate capability indication information, where the capability indication information is used to indicate that the communications apparatus can support simultaneous beam training in a maximum of N frequency bands, and N is an integer greater than or equal to 1; and the transceiver unit is configured to send the capability indication information.

In an embodiment, the processing unit is further configured to simultaneously calculate L1-RSRPs in L frequency bands, where L is an integer less than or equal to N.

In an embodiment, the capability indication information is used to indicate that the communications apparatus can support simultaneous beam training in a maximum of frequency bands for an $i^{th}$ signal set in m signal sets, where i represents a number of a signal set, i traverses values 1, 2, ..., and m, m represents a quantity of the signal sets, $n_i$ is an integer greater than or equal to 1, m is an integer greater than or equal to 1, N is a maximum value of the $i^{th}$ signal set includes at least one signal, and a maximum quantity, of frequency bands for beam training, that can be supported by the communications apparatus for each signal in the at least one signal is $n_i$.

In an embodiment, the processing unit is further configured to calculate L1-RSRPs of first signals simultaneously transmitted in z frequency bands, where z is an integer not greater than and the first signal is any signal in the $i^{th}$ signal set.

In an embodiment, different signal sets in the m signal sets include different signals, and the $i^{th}$ signal set includes at least one type of signal in a channel state information reference signal CSI-RS and a synchronization signal/broadcast channel block SSB.

In an embodiment, the CSI-RS includes at least one type of signal in an aperiodic channel state information reference signal A-CSI-RS, a periodic channel state information reference signal P-CSI-RS, and a semi-persistent channel state information reference signal SP-CSI-RS.

In an embodiment, the capability indication information includes a value of $n_i$.

In an embodiment, m=1. The capability indication information includes first indication information and second indication information. The first indication information is used to indicate a maximum quantity x, of frequency bands that are simultaneously in an active state, supported by the terminal device. The second indication information is used to indicate a maximum quantity y, of analog beams, panels, or spatial domain receive filters that are simultaneously used for receiving, supported by the terminal device. x and y are used to determine a value of $n_1$. Both x and y are integers greater than or equal to 1.

In an embodiment, $n_1$ is a smaller value in x and y.

In an embodiment, the frequency band is a bandwidth part BWP or a beam tracking band.

In an embodiment, the N frequency bands belong to a same carrier CC.

In an embodiment, the CC includes a frequency domain width occupied by one orthogonal frequency division multiplexing OFDM symbol.

The communications apparatus 500 provided in this application corresponds to the process performed by the terminal device in the method embodiment of FIG. 3. For functions of the units/modules in the communications apparatus, refer to the foregoing descriptions. Details are not described herein again.

Therefore, in an embodiment of this application, the terminal device reports the capability indication information to the network device, so that the network device can simultaneously perform beam training in a plurality of frequency bands based on a capability of the terminal device. In this way, beam training efficiency can be improved in this embodiment of this application.

Figure 6:
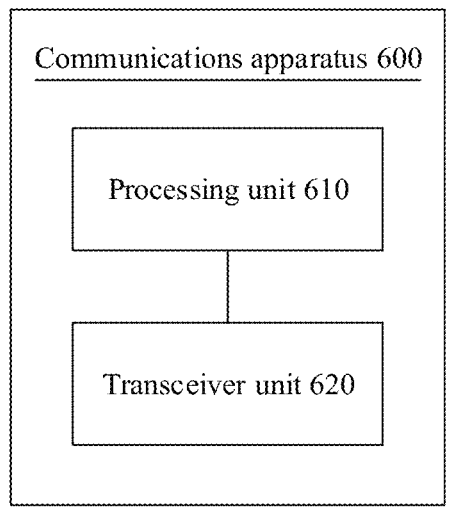
FIG. 6 is a schematic block diagram of another communications apparatus according to this application.

FIG. 6 is a schematic structural diagram of a communications apparatus according to an embodiment of this application. The communications apparatus 600 may include:

a processing unit 610 and a transceiver unit 620.

In an embodiment, the transceiver unit is configured to receive first indication information, where the first indication information is used to indicate a quantity M of frequency bands in which the communications apparatus can simultaneously perform beam training, and M is an integer greater than or equal to 1; and the processing unit is configured to perform beam training based on the first indication information.

In an embodiment, the transceiver unit is further configured to send capability indication information to a network device, where the capability indication information is used to indicate that the communications apparatus can support simultaneous beam training in a maximum of N frequency bands, N is an integer greater than or equal to 1, the first indication information is generated by the network device based on the capability indication information, and M≤N.

In an embodiment, M represents a maximum quantity of frequency bands in which the communications apparatus simultaneously performs beam training. Alternatively, M represents a quantity of frequency bands used when the communications apparatus performs beam training.

In an embodiment, the processing unit is configured to simultaneously calculate layer 1 reference signal received powers L1-RSRPs of signals transmitted in M' frequency bands, where M' is an integer less than or equal to M.

The communications apparatus 600 provided in this application corresponds to the process performed by the terminal device in the method embodiment of FIG. 4. For functions of the units/modules in the communications apparatus, refer to the foregoing descriptions. Details are not described herein again.

Therefore, in this embodiment of this application, based on an indication of the network device, beam training may be simultaneously performed between the network device and the terminal device in a plurality of frequency bands, so that beam training efficiency can be improved in this embodiment of this application.

It should be understood that, the communications apparatus in FIG. 5 and FIG. 6 may be a terminal device, or may be a chip or an integrated circuit installed in a terminal device.

Figure 7:
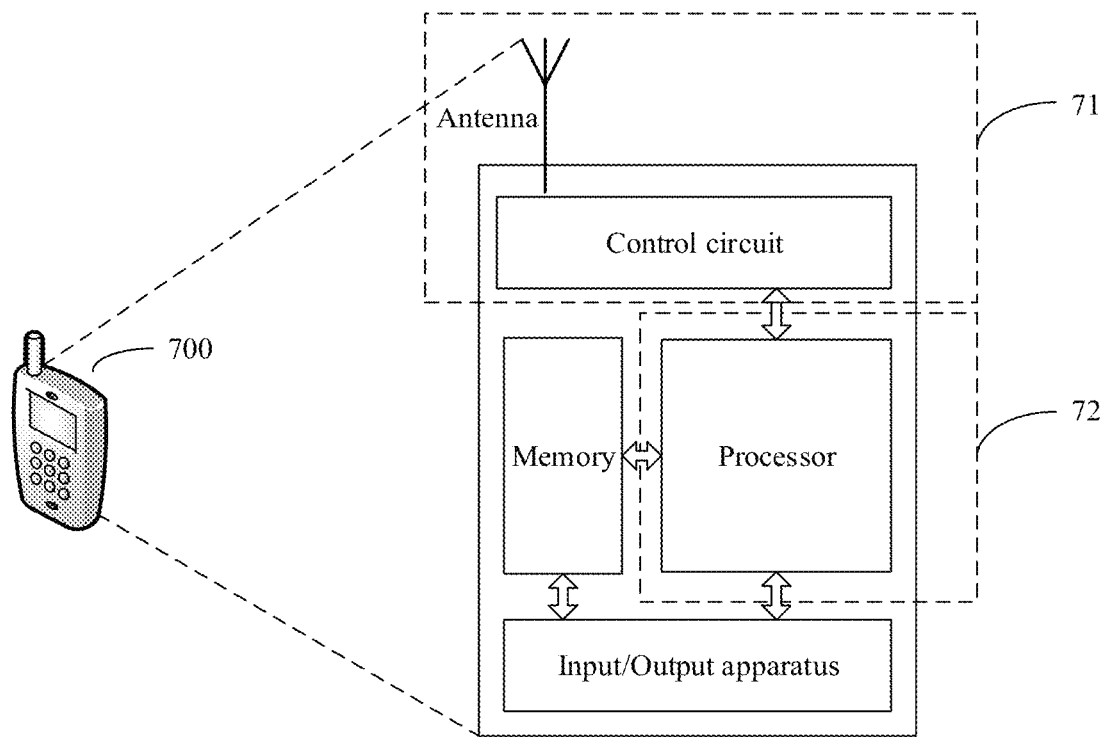
FIG. 7 is a schematic block diagram of a terminal device according to this application.

For example, the communications apparatus is a terminal device. FIG. 7 is a schematic structural diagram of a terminal device according to an embodiment of this application. For ease of understanding and illustration, in FIG. 7, for example, the terminal device is a mobile phone. FIG. 7 shows only main components of the terminal device. The terminal device 700 shown in FIG. 7 includes a processor, a memory, a control circuit, an antenna, and an input/output apparatus. The processor is mainly configured to process a communications protocol and communications data, control the entire terminal device, execute a software program, and process data of the software program, for example, configured to support the terminal device in performing the actions described in the foregoing method embodiments. The memory is configured to store the software program and data. The control circuit is mainly configured to perform conversion between a baseband signal and a radio frequency signal, and process the radio frequency signal. A combination of the control circuit and the antenna may be referred to as a transceiver, mainly configured to send and receive a radio frequency signal in an electromagnetic wave form. The input/output apparatus, such as a touchscreen, a display screen, or a keyboard, is mainly configured to receive data entered by a user and output data to the user.

After the terminal device is powered on, the processor may read the software program in a storage unit, explain and execute an instruction of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 7 shows only one memory and only one processor. Actually, the terminal device may include a plurality of processors and a plurality of memories. The memory may also be referred to as a storage medium, a storage device, or the like. This is not limited in this embodiment of this application.

In an embodiment, the processor may include a baseband processor and a central processing unit. The baseband processor is mainly configured to process the communications protocol and the communications data. The central processing unit is mainly configured to control the entire terminal device, execute the software program, and process the data of the software program. Functions of the baseband processor and the central processing unit may be integrated into the processor in FIG. 7. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communications data may be built in the processor, or may be stored in the storage unit in a form of software program. The processor executes the software program to implement a baseband processing function.

In an embodiment, an antenna having a transceiver function and a control circuit may be considered as a transceiver unit 71 of the terminal device 700, for example, configured to support the terminal device in performing the transceiver function performed by the terminal device in FIG. 5 or FIG. 6, for example, sending capability indication information and/or receiving a signal used for beam training. The processor having a processing function is considered as a processing unit 72 of the terminal device 700, and corresponds to the processing unit 510 in FIG. 5 or the processing unit 610 in FIG. 6, for example, generates capability indication information and/or performs beam training, for example, calculates an L1-RSRP. As shown in FIG. 7, the terminal device 700 includes the transceiver unit 71 and the processing unit 72. The transceiver unit may also be referred to as a transceiver, a transceiver machine, a transceiver apparatus, or the like. The transceiver unit corresponds to the transceiver unit 520 in FIG. 5 or the transceiver unit 620 in FIG. 6. Optionally, a device configured to implement a receiving function in the transceiver unit 71 may be considered as a receiving unit, and a device configured to implement a sending function in the transceiver unit 71 may be considered as a sending unit. In other words, the transceiver unit 71 includes the receiving unit and the sending unit. The receiving unit may also be referred to as a receiver machine, an input port, a receiver circuit, or the like. The sending unit may be referred to as a transmitter machine, a transmitter, a transmitter circuit, or the like.

The processing unit 72 may be configured to execute an instruction stored in the memory, to control the transceiver unit 71 to receive a signal and/or send a signal to complete a function of the terminal device in the foregoing method embodiments. In an implementation, a function of the transceiver unit 71 may be implemented by using a transceiver circuit or a transceiver-dedicated chip.

It should be understood that the terminal device 700 shown in FIG. 7 can implement each process related to the terminal device in the method embodiment of FIG. 2 or FIG. 4. Operations and/or functions of the modules in the terminal device 700 are intended to separately implement corresponding procedures in the foregoing method embodiments. For details, refer to the descriptions in the foregoing method embodiments. To avoid repetition, detailed descriptions are appropriately omitted herein.

Figure 8:
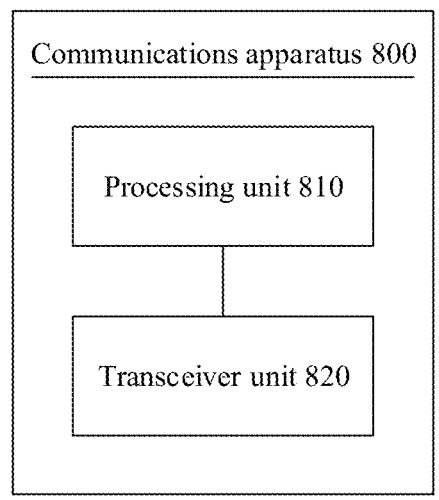
FIG. 8 is a schematic block diagram of another communications apparatus according to this application.

FIG. 8 is a schematic structural diagram of a communications apparatus according to an embodiment of this application. The apparatus 800 may include:

a processing unit 810 and a transceiver unit 820.

In an embodiment, the transceiver unit is configured to receive capability indication information sent by a terminal device, where the capability indication information is used to indicate that the terminal device can support simultaneous beam training in a maximum of N frequency bands, and N is an integer greater than or equal to 1; and the processing unit is configured to indicate, based on the capability indication information, the terminal device to perform beam training.

In an embodiment, the processing unit is configured to indicate, based on the capability indication information, the terminal device to simultaneously calculate L1-RSRPs in L frequency bands, where L is an integer less than or equal to N.

In an embodiment, the capability indication information is used to indicate that the terminal device can support simultaneous beam training in a maximum of $n_i$ frequency bands for an $i^{th}$ signal set in m signal sets, where i represents a number of a signal set, i traverses values 1, 2, ..., and m, m represents a quantity of the signal sets, $n_i$ is an integer greater than or equal to 1, m is an integer greater than or equal to 1, N is a maximum value of the $i^{th}$ signal set includes at least one signal, and a maximum quantity, of frequency bands for beam training, that can be supported by the terminal device for each signal in the at least one signal is $n_i$.

In an embodiment, the processing unit is configured to indicate, based on the capability indication information, the terminal device to calculate L1-RSRPs of first signals simultaneously transmitted in z frequency bands, where z is an integer not greater than $n_i$, and the first signal is any signal in the $i^{th}$ signal set.

In an embodiment, different signal sets in the m signal sets include different signals, the $i^{th}$ signal set includes at least one of signals in a CSI-RS and an SSB.

In an embodiment, the CSI-RS includes at least one type of signal in an aperiodic channel state information reference signal A-CSI-RS, a periodic channel state information reference signal P-CSI-RS, and a semi-persistent channel state information reference signal SP-CSI-RS.

In an embodiment, the capability indication information includes a value of $n_i$.

In an embodiment, m=1. The capability indication information includes first indication information and second indication information. The first indication information is used to indicate a maximum quantity x, of frequency bands that are simultaneously in an active state, supported by the terminal device. The second indication information is used to indicate a maximum quantity y, of analog beams, panels, or spatial domain receive filters that are simultaneously used for receiving, supported by the terminal device. x and y are used to determine a value of $n_1$. Both x and y are integers greater than or equal to 1.

In an embodiment, $n_1$ is a smaller value in x and y.

In an embodiment, the frequency band is a bandwidth part BWP or a beam tracking band.

In an embodiment, the N frequency bands belong to a same carrier CC.

In an embodiment, the CC includes a frequency domain width occupied by one orthogonal frequency division multiplexing OFDM symbol.

The communications apparatus 800 provided in this application corresponds to the process performed by the network device in the method embodiment of FIG. 2. For functions of the units/modules in the communications apparatus, refer to the foregoing descriptions. Details are not described herein again.

Therefore, in this embodiment of this application, the terminal device reports the capability indication information to the network device, so that the network device can simultaneously perform beam training in a plurality of frequency bands based on a capability of the terminal device. In this way, beam training efficiency can be improved in this embodiment of this application.

Figure 9:
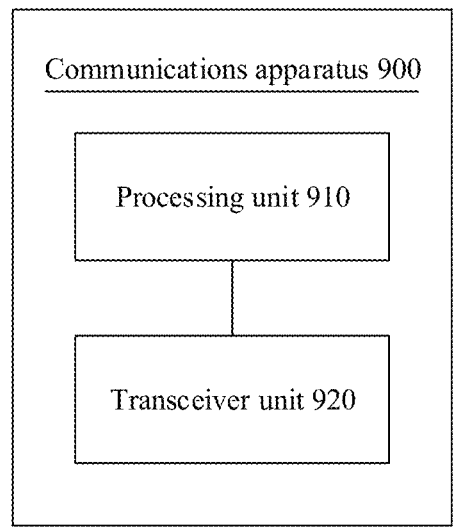
FIG. 9 is a schematic block diagram of another communications apparatus according to this application.

FIG. 9 is a schematic structural diagram of a communications apparatus according to an embodiment of this application. The apparatus 900 may include:

a processing unit 910 and a transceiver unit 920.

In an embodiment, the processing unit is configured to generate first indication information, where the first indication information is used to indicate a quantity M of frequency bands in which the terminal device can simultaneously perform beam training, and M is an integer greater than or equal to 1; and the transceiver unit is configured to send the first indication information to the terminal device.

In an embodiment, the transceiver unit is further configured to receive capability indication information sent by the terminal device, where the capability indication information is used to indicate that the terminal device can support simultaneous beam training in a maximum of N frequency bands, N is an integer greater than or equal to 1, and M≤N.

The processing unit is configured to generate the first indication information based on the capability indication information.

In an embodiment, M represents a maximum quantity of frequency bands in which the terminal device simultaneously performs beam training. Alternatively, M represents a quantity of frequency bands used when the terminal device performs beam training.

The communications apparatus 900 provided in this application corresponds to the process performed by the network device in the method embodiment of FIG. 4. For functions of the units/modules in the communications apparatus, refer to the foregoing descriptions. Details are not described herein again.

Therefore, in this embodiment of this application, based on an indication of the network device, beam training may be simultaneously performed between the network device and the terminal device in a plurality of frequency bands, so that beam training efficiency can be improved in this embodiment of this application.

It should be understood that, the communications apparatus in FIG. 8 or FIG. 9 may be a network device, or may be a chip or an integrated circuit installed in a network device.

Figure 10:
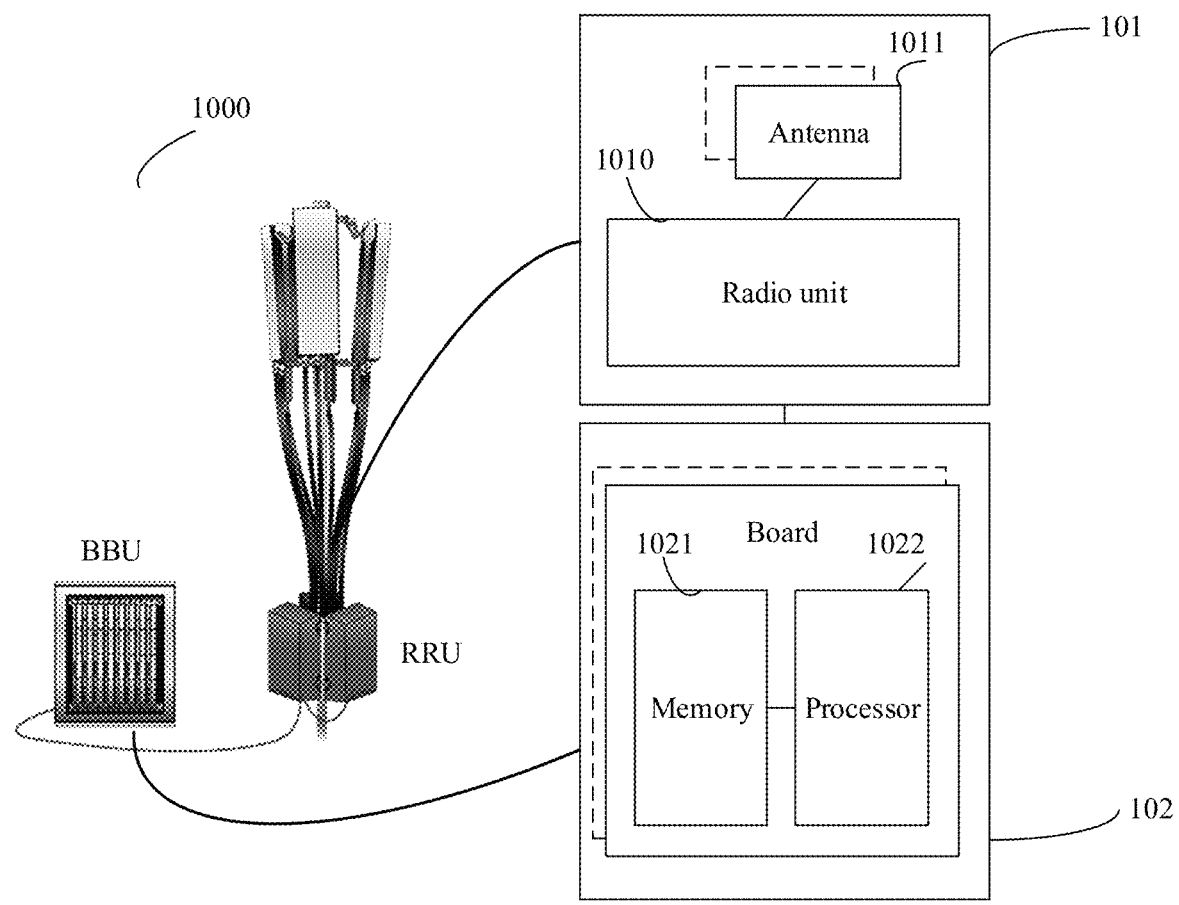
FIG. 10 is a schematic block diagram of a network device according to this application.

For example, the communications apparatus is a network device. FIG. 10 is a schematic structural diagram of a network device according to an embodiment of this application. For example, FIG. 10 may be a schematic structural diagram of a base station. As shown in FIG. 10, the network device 1000 may be applied to the system shown in FIG. 1, and performs functions of the network device in the foregoing method embodiments.

The network device 1000 may include one or more radio units, for example, a remote radio unit (remote radio unit, RRU) 101 and one or more baseband units (BBU) (which may also be referred to as a digital unit (DU)) 102. The RRU 101 may be referred to as a transceiver unit 101, and corresponds to the transceiver unit 820 in FIG. 8 or the transceiver unit 920 in FIG. 9. Optionally, the transceiver unit may also be referred to as a transceiver machine, a transceiver circuit, a transceiver, or the like, and may include at least one antenna 1011 and a radio unit 1012. The RRU 101 part is mainly configured to receive and send a radio frequency signal and perform conversion between the radio frequency signal and a baseband signal, for example, configured to send a signal used for beam training or the like to a terminal device. The BBU 102 part is mainly configured to perform baseband processing, control the base station, and the like. The RRU 101 and the BBU 102 may be physically disposed together, or may be physically separately disposed, that is, a distributed base station.

The BBU 102 is a control center of the base station, may also be referred to as a processing unit 102, may correspond to the processing unit 810 in FIG. 8 or the processing unit 910 in FIG. 9, and is mainly configured to complete baseband processing functions such as channel coding, multiplexing, modulation, and spectrum spreading. For example, the BBU (the processing unit) may be configured to control the base station to perform an operation procedure related to the network device in the foregoing method embodiments, for example, perform beam training.

In an example, the BBU 102 may include one or more boards, and a plurality of boards may jointly support a radio access network (for example, an LTE network) having single access standard, or may separately support radio access networks (for example, an LTE network, a 5G network, or another network) having different access standards. The BBU 102 further includes a memory 1021 and a processor 1022. The memory 1021 is configured to store a necessary instruction and necessary data. The processor 1022 is configured to control the base station to perform a necessary action, for example, is configured to control the base station to perform an operation procedure related to the network device in the foregoing method embodiments, for example, perform beam training. The memory 1021 and the processor 1022 may serve one or more boards. In other words, a memory and a processor may be separately disposed on each board. Alternatively, a plurality of boards may share a same memory and a same processor. In addition, a necessary circuit may further be disposed on each board.

It should be understood that the network device 1000 shown in FIG. 10 can implement processes related to the network device in the method embodiment of FIG. 2 or FIG. 4. Operations and/or functions of the modules in the network device 1000 are intended to separately implement corresponding procedures in the foregoing method embodiments. For details, refer to the descriptions in the foregoing method embodiments. To avoid repetition, detailed descriptions are appropriately omitted herein.

An embodiment of this application further provides a processing apparatus, including a processor and an interface, where the processor is configured to perform the communication method in any one of the foregoing method embodiments.

It should be understood that the processing apparatus may be a chip. For example, the processing apparatus may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an embodiment, operations in the foregoing methods can be implemented by using a hardware integrated logical circuit in the processor, or by using instructions in a form of software. The operations of the methods disclosed with reference to the embodiments of this application may be directly performed by a hardware processor, or may be performed by using a combination of hardware in a processor and a software module. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

It should be noted that, the processor in an embodiment may be an integrated circuit chip, and has a signal processing capability. In an embodiment, operations in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the operations, and logical block diagrams that are disclosed in the embodiments of the application. The general purpose processor may be a microprocessor, or the processor may be any conventional processor or the like. The operations of the methods disclosed with reference to the embodiments of the application may be directly performed by a hardware decoding processor, or may be performed by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory in an embodiment of the application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

An embodiment of this application further provides a communications system, including the foregoing network device and terminal device.

An embodiment of this application further provides a computer-readable medium. The computer-readable medium stores a computer program. When the computer program is executed by a computer, the communication method in any one of the foregoing method embodiments is implemented.

An embodiment of this application further provides a computer program product. When the computer program product is executed by a computer, the communication method in any one of the foregoing method embodiments is implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive (solid state disk, SSD)), or the like.

It should be understood that, although the foregoing describes a communication method in downlink transmission in a communications system, this application is not limited to this. In an embodiment, a solution similar to that in the foregoing description may also be used in uplink transmission. To avoid repetition, details are not described again herein.

The network device and the terminal device in the foregoing apparatus embodiments entirely correspond to the network device or the terminal device in the method embodiments. A corresponding module or unit performs a corresponding operation. For example, a sending module (transmitter) performs a sending operation in the method embodiments, a receiving module (receiver) performs a receiving operation in the method embodiments, and another operation different from the sending and receiving operations may be performed by a processing module (processor). For a function of a module, refer to a corresponding method embodiment. The sending module and the receiving module may form a transceiver module, and the transmitter and the receiver may form a transceiver, to jointly implement receiving and sending functions. There may be one or more processors.

In this application, "at least one" means one or more, and "a plurality of" means two or more. "And/Or" describes an association relationship for associated objects and represents that three relationships may exist. For example, A and/or B may represent the following three cases: Only A exists, both A and B exist, and only B exists, where A and B may be singular or plural. The character "/" generally indicates an "or" relationship between the associated objects. "At least one item (piece) of the following" or a similar expression thereof means any combination of these items, including any combination of singular items (pieces) or plural items (pieces). For example, at least one item (piece) of a, b, or c may indicate: a, b, c, a-b, a-c, b-c, or a-b-c, where a, b, and c may be singular or plural.

It should be understood that "one embodiment" or "an embodiment" mentioned throughout the specification means that particular features, structures, or characteristics related to the embodiment are included in at least one embodiment of the application. Therefore, "in one embodiment" or "in an embodiment" appearing throughout the specification does not necessarily refer to a same embodiment. In addition, these particular features, structures, or characteristics may be combined in one or more embodiments by using any appropriate manner. It should be understood that sequence numbers of the foregoing processes do not mean execution sequences in the embodiments of the application. The execution sequences of the processes should be determined according to functions and internal logic of the processes, and should not be construed as any limitation on the implementation processes of the embodiments of the application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be further understood that, the first, second, third, fourth, and various numeric numbers included in this specification are merely distinguished for convenient description, and are not intended to limit the scope of the embodiments of this application.

The term "and/or" in this specification describes only an association relationship for describing associated objects and represents that three relationships may exist. For example, A and/or B may represent the following three cases: Only A exists, both A and B exist, and only B exists.

A person of ordinary skill in the art may be aware that, in combination with illustrative logical blocks described in the embodiments disclosed in this specification and operations (operation) may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions (programs). When the computer program instructions (programs) are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A beam training method, comprising:
generating, by a terminal device, capability indication information indicating that the terminal device can support simultaneous beam training in a maximum of N frequency bands, wherein the capability indication information indicates that the terminal device supports simultaneous beam training in a maximum of $n_i$ frequency bands for an $i^{th}$ signal set in m signal sets, wherein N is an integer greater than or equal to 1; and
sending, by the terminal device, the capability indication information.

2. The method according to claim 1, further comprising:
simultaneously calculating, by the terminal device, layer 1 reference signal received powers (L1-RSRPs) in L frequency bands, wherein L is an integer less than or equal to N.

3. The method according to claim 1,
wherein i represents a number of a signal set, i traverses values 1, 2, . . . , and m, m represents a quantity of the signal sets, $n_i$ is an integer greater than or equal to 1, m is an integer greater than or equal to 1, N is a maximum value of $n_i$, the $i^{th}$ signal set comprises at least one signal, and a maximum quantity, of frequency bands for beam training, that can be supported by the terminal device for each signal in the at least one signal is $n_i$.

4. The method according to claim 3, further comprising:
calculating, by the terminal device, L1-RSRPs of first signals simultaneously transmitted in z frequency bands, wherein z is an integer not greater than $n_i$, and wherein the first signal is any signal in the $i^{th}$ signal set.

5. The method according to claim 3, wherein different signal sets in the m signal sets comprise different signals, and the $i^{th}$ signal set comprises at least one type of signal in a channel state information reference signal (CSI-RS) and a synchronization signal/broadcast channel block (SSB).

6. The method according to claim 5, wherein
the CSI-RS comprises at least one type of signal in an aperiodic channel state information reference signal (A-CSI-RS), a periodic channel state information reference signal (P-CSI-RS), and a semi-persistent channel state information reference signal (SP-CSI-RS).

7. A communications apparatus, comprising:
at least one processor, wherein the at least one processor is configured to read an instruction in a memory and implement:
generating capability indication information indicating that the communications apparatus can support simultaneous beam training in a maximum of N frequency bands, wherein the capability indication information indicates that the terminal device supports simultaneous beam training in a maximum of $n_i$ frequency bands for an $i^{th}$ signal set in m signal sets, wherein N is an integer greater than or equal to 1; and
causing a transceiver to send the capability indication information.

8. The communications apparatus according to claim 7, wherein
the at least one processor is further configured to implement: simultaneously calculating layer 1 reference signal received powers (L1-RSRPs) in L frequency bands, wherein L is an integer less than or equal to N.

9. The communications apparatus according to claim 7, wherein i represents a number of a signal set, i traverses values 1, 2, . . . , and m, m represents a quantity of the signal sets, $n_i$ is an integer greater than or equal to 1, m is an integer greater than or equal to 1, N is a maximum value of $n_i$, the $i^{th}$ signal set comprises at least one signal, and a maximum quantity, of frequency bands for beam training, that can be supported by the communications apparatus for each signal in the at least one signal is $n_i$.

10. The communications apparatus according to claim 9, wherein
the at least one processor is further configured to implement: calculating L1-RSRPs of first signals simultaneously transmitted in z frequency bands, wherein z is an integer not greater than $n_i$, and the first signal is any signal in the $i^{th}$ signal set.

11. The communications apparatus according to claim 9, wherein
different signal sets in the m signal sets comprise different signals, and the $i^{th}$ signal set comprises at least one type of signal in a channel state information reference signal (CSI-RS) and a synchronization signal/broadcast channel block (SSB).

12. The communications apparatus according to claim 11, wherein
the CSI-RS comprises at least one type of signal in an aperiodic channel state information reference signal (A-CSI-RS), a periodic channel state information reference signal (P-CSI-RS), and a semi-persistent channel state information reference signal (SP-CSI-RS).

13. The communications apparatus according to claim 7, wherein
the apparatus is a terminal device or a chip.

14. A communications apparatus, comprising at least one processor, wherein the at least one processor is configured to read an instruction in a memory and implement:
causing a transceiver to receive capability indication information from a terminal device, wherein the capability indication information indicates that the terminal device can support simultaneous beam training in a maximum of N frequency bands, wherein the capability indication information indicates that the terminal device supports simultaneous beam training in a maximum of $n_i$ frequency bands for an $i^{th}$ signal set in m signal sets, wherein N is an integer greater than or equal to 1; and
indicating, based on the capability indication information, the terminal device to perform beam training.

15. The communications apparatus according to claim 14, wherein
the at least one processor is specifically configured to implement:
indicating, based on the capability indication information, the terminal device to simultaneously calculate layer 1 reference signal received powers (L1-RSRPs) in L frequency bands, wherein L is an integer less than or equal to N.

16. The communications apparatus according to claim 14, wherein i represents a number of a signal set, i traverses values 1, 2, . . . , and m, m represents a quantity of the signal sets, $n_i$ is an integer greater than or equal to 1, m is an integer greater than or equal to 1, N is a maximum value of $n_i$, the $i^{th}$ signal set comprises at least one signal, and a maximum quantity, of frequency bands for beam training, that can be supported by the terminal device for each signal in the at least one signal is $n_i$.

17. The communications apparatus according to claim 16, wherein
the at least one processor is specifically configured to implement: indicating, based on the capability indication information, the terminal device to calculate L1-RSRPs of first signals simultaneously transmitted in z frequency bands, wherein z is an integer not greater than $n_i$, and wherein the first signal is any signal in the $i^{th}$ signal set.

18. The communications apparatus according to claim 16, wherein different signal sets in the m signal sets comprise different signals, and the $i^{th}$ signal set comprises at least one type of signal in a channel state information reference signal (CSI-RS) and a synchronization signal/broadcast channel block (SSB).

19. The communications apparatus according to claim 18, wherein
 the CSI-RS comprises at least one type of signal in an aperiodic channel state information reference signal (A-CSI-RS), a periodic channel state information reference signal (P-CSI-RS), and a semi-persistent channel state information reference signal (SP-CSI-RS).

20. The communications apparatus according to claim 14, wherein the apparatus is a network device or a chip.

* * * * *